(12) United States Patent
Nielsen et al.

(10) Patent No.: US 9,046,413 B2
(45) Date of Patent: Jun. 2, 2015

(54) METHODS, APPARATUS AND SYSTEMS FOR SURFACE TYPE DETECTION IN CONNECTION WITH LOCATE AND MARKING OPERATIONS

(75) Inventors: Steven Nielsen, North Palm Beach, FL (US); Curtis Chambers, Palm Beach Gardens, FL (US); Jeffrey Farr, Jupiter, FL (US); Jack M. Vice, Stafford, VA (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 536 days.

(21) Appl. No.: 13/210,291
(22) Filed: Aug. 15, 2011
(65) Prior Publication Data
US 2012/0065924 A1 Mar. 15, 2012

Related U.S. Application Data

(63) Continuation-in-part of application No. 13/210,237, filed on Aug. 15, 2011.

(60) Provisional application No. 61/373,451, filed on Aug. 13, 2010, provisional application No. 61/374,034, filed on Aug. 16, 2010, provisional application No. 61/373,475, filed on Aug. 13, 2010.

(51) Int. Cl.
*G01K 11/30* (2006.01)
*H04N 7/18* (2006.01)
(Continued)

(52) U.S. Cl.
CPC ............... *G01J 3/0264* (2013.01); *G01J 3/463* (2013.01); *G01C 15/02* (2013.01); *G06K 9/0063* (2013.01)

(58) Field of Classification Search
USPC ............. 702/135, 81, 84, 127, 130, 134, 136, 702/188–189; 427/136–138, 160; 348/82, 348/164; 404/17, 71–72, 83, 101, 108, 110; 700/283, 285
See application file for complete search history.

(56) References Cited

U.S. PATENT DOCUMENTS 5,025,150 A 6/1991 Oldham et al.
5,467,271 A 11/1995 Abel et al.
(Continued)

FOREIGN PATENT DOCUMENTS

CA 2623761 10/2008
CA 2623466 6/2011
(Continued)

OTHER PUBLICATIONS

Beauregard, "A Helmet-Mounted Pedestrian Dead Reckoning System," IFAWC 2006, Mar. 15-16, Mobile Research Center, Tzi Universitat Breman, Germany, 11 pages.
(Continued)

*Primary Examiner* — Toan Le

(57) ABSTRACT

Systems, methods, and apparatus for performing surface type detection in connection with locate and marking operations. In some embodiments, one or more sensors may be employed to collect information regarding a ground surface on which marking material is to be dispensed which is then analyzed to provide an estimate of a type of the surface. For example, a still-image or video camera may be used as a sensor that detects visible light reflecting from a surface. One or more images captured by the camera may be analyzed using analysis software to identify one or more characteristics indicative of a surface type. As another example, one or more radiation sensors may be employed to measure an amount of electromagnetic radiation reflected by the sensed surface one or more selected wavelengths or ranges of wavelengths to identify a spectral signature that may also be indicative of a surface type.

24 Claims, 13 Drawing Sheets

(51) Int. Cl.
*E01C 19/12* (2006.01)
*G01J 3/02* (2006.01)
*G01J 3/46* (2006.01)
*G01C 15/02* (2006.01)
*G06K 9/00* (2006.01)

(56) References Cited

U.S. PATENT DOCUMENTS

| | | | |
|---|---|---|---|
| 5,486,067 A | 1/1996 | Huynh | |
| 5,517,419 A | 5/1996 | Lanckton et al. | |
| 5,742,509 A | 4/1998 | Goldberg et al. | |
| 5,751,450 A | 5/1998 | Robinson | |
| 6,026,135 A | 2/2000 | McFee et al. | |
| 6,037,010 A | 3/2000 | Kahmann et al. | |
| 6,074,693 A | 6/2000 | Manning | |
| 6,083,353 A | 7/2000 | Alexander, Jr. | |
| 6,119,621 A | 9/2000 | Johnson | |
| 6,138,906 A | 10/2000 | DeMayo | |
| 6,157,320 A * | 12/2000 | Yujiri et al. | 340/901 |
| 6,299,934 B1 | 10/2001 | Manning | |
| 6,327,533 B1 | 12/2001 | Chou | |
| 6,330,503 B1 | 12/2001 | Sharp | |
| 6,362,778 B2 | 3/2002 | Neher | |
| 6,390,336 B1 | 5/2002 | Orozco | |
| 6,414,629 B1 | 7/2002 | Curcio | |
| 6,429,790 B1 | 8/2002 | Frese | |
| 6,437,708 B1 | 8/2002 | Brouwer | |
| 6,526,400 B1 | 2/2003 | Takata | |
| 6,536,553 B1 | 3/2003 | Scanlon | |
| 6,658,148 B1 | 12/2003 | Fung et al. | |
| 6,665,432 B1 | 12/2003 | Evans et al. | |
| 6,693,585 B1 | 2/2004 | MacLeod | |
| 6,750,816 B1 | 6/2004 | Kunysz | |
| 6,876,945 B2 | 4/2005 | Emord | |
| 6,944,542 B1 | 9/2005 | Eschenbach | |
| 6,972,719 B1 | 12/2005 | Swope | |
| 7,057,383 B2 | 6/2006 | Schlapp et al. | |
| 7,091,852 B2 | 8/2006 | Mason et al. | |
| 7,113,124 B2 | 9/2006 | Waite | |
| 7,120,564 B2 | 10/2006 | Pacey | |
| 7,123,152 B2 | 10/2006 | Contractor | |
| 7,143,130 B2 | 11/2006 | Lin | |
| 7,162,367 B2 | 1/2007 | Lin et al. | |
| 7,236,091 B2 | 6/2007 | Kiang et al. | |
| 7,245,215 B2 | 7/2007 | Gollu | |
| 7,246,031 B2 | 7/2007 | Boudreaux | |
| 7,298,323 B2 | 11/2007 | Park | |
| 7,319,387 B2 | 1/2008 | Willson et al. | |
| 7,356,421 B2 | 4/2008 | Gudmundsson et al. | |
| 7,372,247 B1 | 5/2008 | Giusti et al. | |
| 7,379,015 B2 | 5/2008 | Workman | |
| 7,400,246 B2 | 7/2008 | Breeding | |
| 7,403,853 B1 | 7/2008 | Janky et al. | |
| 7,443,154 B1 | 10/2008 | Merewether et al. | |
| 7,538,688 B1 | 5/2009 | Stewart | |
| 7,538,724 B1 | 5/2009 | Baillot | |
| 7,541,974 B2 | 6/2009 | Scherzinger | |
| 7,640,105 B2 | 12/2009 | Nielsen et al. | |
| 7,929,981 B2 | 4/2011 | Sangberg | |
| 8,060,304 B2 | 11/2011 | Nielsen et al. | |
| 8,155,390 B2 | 4/2012 | Nielsen et al. | |
| 8,194,932 B2 | 6/2012 | Nielsen et al. | |
| 8,218,827 B2 | 7/2012 | Nielsen et al. | |
| 8,249,306 B2 | 8/2012 | Nielsen et al. | |
| 8,260,489 B2 | 9/2012 | Nielsen et al. | |
| 8,265,344 B2 | 9/2012 | Nielsen et al. | |
| 8,270,666 B2 | 9/2012 | Nielsen et al. | |
| 8,280,117 B2 | 10/2012 | Nielsen et al. | |
| 8,280,631 B2 | 10/2012 | Nielsen et al. | |
| 8,280,969 B2 | 10/2012 | Nielsen et al. | |
| 8,290,204 B2 | 10/2012 | Nielsen et al. | |
| 8,290,215 B2 | 10/2012 | Nielsen et al. | |
| 8,296,308 B2 | 10/2012 | Nielsen et al. | |
| 8,300,895 B2 | 10/2012 | Nielsen et al. | |
| 8,301,380 B2 | 10/2012 | Nielsen et al. | |
| 8,311,765 B2 | 11/2012 | Nielsen et al. | |
| 8,340,359 B2 | 12/2012 | Nielsen et al. | |
| 8,355,542 B2 | 1/2013 | Nielsen et al. | |
| 8,356,255 B2 | 1/2013 | Nielsen et al. | |
| 8,361,543 B2 | 1/2013 | Nielsen et al. | |
| 8,374,789 B2 | 2/2013 | Nielsen et al. | |
| 8,384,742 B2 | 2/2013 | Nielsen et al. | |
| 8,386,178 B2 | 2/2013 | Nielsen et al. | |
| 8,401,791 B2 | 3/2013 | Nielsen et al. | |
| 8,407,001 B2 | 3/2013 | Nielsen et al. | |
| 8,473,148 B2 | 6/2013 | Nielsen et al. | |
| 8,480,332 B2 | 7/2013 | Miller | |
| 8,532,341 B2 | 9/2013 | Nielsen et al. | |
| 8,543,937 B2 | 9/2013 | Nielsen et al. | |
| 8,577,707 B2 | 11/2013 | Nielsen et al. | |
| 8,589,201 B2 | 11/2013 | Nielsen et al. | |
| 8,589,202 B2 | 11/2013 | Nielsen et al. | |
| 8,612,090 B2 | 12/2013 | Nielsen et al. | |
| 8,612,148 B2 | 12/2013 | Nielsen et al. | |
| 8,612,271 B2 | 12/2013 | Nielsen et al. | |
| 8,612,276 B1 | 12/2013 | Nielsen et al. | |
| 8,630,463 B2 | 1/2014 | Nielsen et al. | |
| 8,903,643 B2 | 12/2014 | Nielsen et al. | |
| 2002/0103625 A1 | 8/2002 | Card et al. | |
| 2002/0122115 A1 | 9/2002 | Harmath | |
| 2003/0130820 A1 | 7/2003 | Lane, III | |
| 2003/0168834 A1 | 9/2003 | Ulrich | |
| 2004/0051368 A1 | 3/2004 | Caputo | |
| 2004/0124988 A1 | 7/2004 | Leonard et al. | |
| 2004/0210370 A1 | 10/2004 | Gudat | |
| 2005/0156600 A1 | 7/2005 | Olsson | |
| 2005/0232475 A1 | 10/2005 | Floeder | |
| 2006/0013480 A1 | 1/2006 | Sano | |
| 2006/0037528 A1 | 2/2006 | Farritor | |
| 2006/0055584 A1 | 3/2006 | Waite et al. | |
| 2006/0085133 A1 | 4/2006 | Young | |
| 2006/0125644 A1 | 6/2006 | Sharp | |
| 2006/0188131 A1 | 8/2006 | Zhang et al. | |
| 2006/0262963 A1 | 11/2006 | Navulur | |
| 2006/0276985 A1 | 12/2006 | Xu | |
| 2006/0282280 A1 | 12/2006 | Stotz et al. | |
| 2006/0289679 A1 | 12/2006 | Johnson et al. | |
| 2007/0031042 A1 | 2/2007 | Simental | |
| 2007/0191025 A1 | 8/2007 | McBrierty et al. | |
| 2007/0219722 A1 | 9/2007 | Sawyer, Jr. | |
| 2007/0222640 A1 | 9/2007 | Guelzow, II | |
| 2007/0223803 A1 | 9/2007 | Shindo | |
| 2007/0285217 A1 | 12/2007 | Ishikawa et al. | |
| 2008/0010009 A1 | 1/2008 | Miyoshi | |
| 2008/0013940 A1 | 1/2008 | Jung | |
| 2008/0125970 A1 | 5/2008 | Scheckler | |
| 2008/0140256 A1 | 6/2008 | Nishiyama | |
| 2008/0186166 A1 | 8/2008 | Zhou et al. | |
| 2008/0228294 A1 * | 9/2008 | Nielsen et al. | 700/58 |
| 2008/0234902 A1 | 9/2008 | Johnson et al. | |
| 2008/0258590 A1 | 10/2008 | Van De Sluis et al. | |
| 2008/0285848 A1 | 11/2008 | Meyer et al. | |
| 2008/0310721 A1 | 12/2008 | Yang | |
| 2009/0012448 A1 | 1/2009 | Childers et al. | |
| 2009/0021514 A1 | 1/2009 | Klusza | |
| 2009/0043504 A1 | 2/2009 | Bandyopadhyay et al. | |
| 2009/0073034 A1 | 3/2009 | Lin | |
| 2009/0128156 A1 | 5/2009 | Li et al. | |
| 2009/0157746 A1 | 6/2009 | More et al. | |
| 2009/0184823 A1 | 7/2009 | Tessier | |
| 2009/0185858 A1 | 7/2009 | Malit | |
| 2009/0201311 A1 | 8/2009 | Nielsen et al. | |
| 2009/0202101 A1 | 8/2009 | Nielsen et al. | |
| 2009/0202111 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210298 A1 | 8/2009 | Nielsen et al. | |
| 2009/0233573 A1 | 9/2009 | Gray | |
| 2009/0238415 A1 | 9/2009 | Nielsen et al. | |

(56) References Cited

U.S. PATENT DOCUMENTS

| | | |
|---|---|---|
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0103266 A1 | 4/2010 | Merkel et al. |
| 2010/0117654 A1 | 5/2010 | Nielsen et al. |
| 2010/0146454 A1 | 6/2010 | Sugahara |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0203933 A1 | 8/2010 | Eyzaguirre et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0019027 A1 | 1/2011 | Fujita et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0199461 A1 | 8/2011 | Horio et al. |
| 2011/0216188 A1 | 9/2011 | Thwing et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |

FOREIGN PATENT DOCUMENTS

| | | |
|---|---|---|
| EP | 2112630 | 10/2009 |
| WO | WO9516827 | 6/1995 |
| WO | WO0194016 | 12/2001 |
| WO | WO0228541 | 4/2002 |
| WO | WO03021044 | 3/2003 |

OTHER PUBLICATIONS

Carbonari et al., A Proactive System for Real-time Safety Management in Construction Sites, 26th International Symposium on Automation and Robotics in Construction (ISARC 2009), pp. 47-54.

Chae et al., "A Location System with RFID Technology in Building Construction Site," 22nd International Symposium on Automation and Robotics in Construction (ISARC 2005), pp. 1-6.

Chae et al., An Estimating Method of Worker's Task with 6-DOF Sensors, 21st International Symposium on Automation and Robotics in Construction (ISARC 2004), 6 pages.

(56) References Cited

OTHER PUBLICATIONS

Clark et al., "Analysis of Improvement to Two-Wheel Robot Navigation Using Low-Cost GPS/INS Aids," Proceedings of the Institute of Navigation, 19th International Technical Meeting of the Satellite Division, Dec. 1, 2006, 9 pages.
El-Omari et al., "Integrating Automated Data Acquisition Technologies for Progress Reporting of Construction Projects," 26th International Symposium on Automation and Robotics in Construction (ISARC 2009), pp. 86-94.
European Search Report, Application No. 08743671.3, Nov. 16, 2011.
Fang et al., "Design of a Wireless Assisted Pedestrian Dead Reckoning System—The NavMote Experience," IEEE Transactions on Instrumentation and Measurement. vol. 54, No. 6, 2005, pp. 1-16.
Fang, L. et al., "Design of a Wireless Assisted Pedestrian Dead Reckoning System—The NAVMote Experience," Dec. 2005, IEEE Transactions on Instrumentation and Measurement.
Fumio et al., "Development of Digital Photo System Using RFID Technology in Plant Construction Management," 26th International Symposium on Automation and Robotics in Construction (ISARC 2009), pp. 68-75.
Giretti et al., "Advanced Real-Time Safety Management System for Construction Sites," The 25th International Symposium on Automation and Robotics in Construction, Jun. 26-28, 2008, pp. 300-305.
Griffin, "Emerging Technologies for Transportation Construction," Transportation in the New Millenium, 2000, 7 pages.
International Search Report and Written Opinion, Application No. PCT/US11/51616, dated Jan. 31, 2012.
International Search Report and Written Opinion, Application No. PCT/US2011/047805, Dec. 14, 2011.
International Search Report and Written Opinion, Application No. PCT/US2011/047807, Dec. 6, 2011.
International Search Report and Written Opinion, Application No. PCT/US2012/36198, Oct. 22, 2012.
International Search Report, Application No. PCT/US2011/052132, Dec. 17, 2012.
Jackson, J.D. et al., "A Method for Relative Position Tracking of Vehicles Using Optical Navigation Technology," Proc. of the 6th WSEAS Int. Conf. on Signal Processing, Dallas, TX, Mar. 22-24, 2007, pp. 163-166.
Khoury et al, "Evaluation of position tracking technologies for user localization in indoor construction environments," Automation in Construction, vol. 18, Issue 4, Jul. 2009, pp. 444-457, see Abstract.
Khoury, "Automated Georeferenced User Position Tracking for Contextual Information Retrieval on Construction Sites," 24th International Symposium on Automation and Robotics in Construction (ISARC 2007), pp. 11-15.
Lu et al., "Positioning and tracking construction vehicles in highly dense urban areas and building construction sites," Automation in Construction, vol. 16 (2007), pp. 647-656.
Navon et al., "Assessing research issues in Automated Project Performance Control (APPC)," Automation in Construction, vol. 16 (2007), pp. 474-484.
Navon et al., "Monitoring labor inputs: automated-data-collection model and enabling technologies," Automation in Construction, vol. 12 (2002), pp. 185-199.
Navon, "Present Status and Future Prospects of Automated Project Performance Indicators' Measurement," (ISARC 2006), pp. 400-405.
Navon, "Research on Automated Project Performance Control: An Update," 26th International Symposium on Automation and Robotics in Construction (ISARC 2009), pp. 126-128.
Notice of Allowance dated Aug. 25, 2011 from U.S. Appl. No. 11/696,606.
Office Action dated Jan. 12, 2012 from U.S. Appl. No. 12/364,369.
Office Action dated Sep. 26, 2011 from Canadian Application No. 2,739,119.
Office Action dated Sep. 26, 2011 from Canadian Application No. 2,739,320.
Office Action dated Oct. 4, 2011 from U.S. Appl. No. 12/364,359.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 15, 2011 from Canadian Application No. 2,691,707.
Office Action dated Dec. 30, 2011 from U.S. Appl. No. 12/701,447.
Office Action dated Jul. 11, 2011 from Canadian Application No. 2713282.
Office Action dated Oct. 6, 2010 from Canadian Application No. 2623761.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Teizer et al., "Analyzing the Travel Patterns of Construction Workers," The 25th International Symposium on Automation and Robotics in Construction, Jun. 26-28, 2008, pp. 391-396.
Nielsen et al., co-pending U.S. Patent No. 8,311,765, issued Nov. 13, 2012.
Nielsen et al., co-pending U.S. Publication No. 2010-0113244, published May 10, 2012.
Nielsen et al., co-pending U.S. Publication No. 2011-0045175, published Feb. 24, 2011.
Nielsen et al., co-pending U.S. Publication No. 2011-0060549, published Mar. 10, 2011.
Nielsen et al., co-pending U.S. Publication No. 2011-0117272, published May 19, 2011.
Nielsen et al., co-pending U.S. Publication No. 2010-0069178, published Mar. 22, 2012.
Nielsen et al., co-pending U.S. Publication No. 2012-0072035, published Mar. 22, 2012.
Nielsen et al., co-pending U.S. Publication No. 2013-0002854, published Jan. 3, 2013.
Office Action dated Jan. 27, 2014 from U.S. Appl. No. 13/236,162.
Office Action dated Mar. 12, 2014 from U.S. Appl. No. 13/210,237.
Patent Examination Report dated Sep. 9, 2014 from Australian Application No. 2011289157.
Office Action dated Jun. 27, 2014 from U.S. Appl. No. 13/236,162.
Delorme, "Increase Efficiency and Productivity Using XMap," Business Solutions for Agriculture, Nov. 2009, 3 pages.
Nowatzki, J. et al., "Variable-rate Fertilization for Field Crops," NDSU Extension Service, Dec. 2009, 4 pages.
Patent Examination Report dated Oct. 23, 2014 from Australian Application No. 2011289156.
Patent Examination Report dated Sep. 24, 2014 from Australian Application No. 201130182.
Office Action dated Sep. 5, 2014 from U.S. Appl. No. 13/210,237.
Office Action dated Aug. 29, 2014 from U.S. Appl. No. 13/232,790.
Dille, Michael et al., "Outdoor Downward-Facing Optical Flow Odometry with Commodity Sensors," Field and Service Robotics, Jul. 2009, vol. 62, pp. 1-10.
Supplementary European Search Report dated Oct. 22, 2014 from EP Application No. 12779689.4.
Office Action dated Jan. 27, 2015 from U.S. Appl. No. 13/210,237.
Office Action dated Feb. 13, 2015 from U.S. Appl. No. 13/232,790.
Schumann, Arnold W., "Precise Placement and Variable Rate Fertilizer Application Technologies," Workshop on BMP Research and Extension Priorities for Horticultural Crops, pub. May 20-21, 2008, 45 pages.

\* cited by examiner

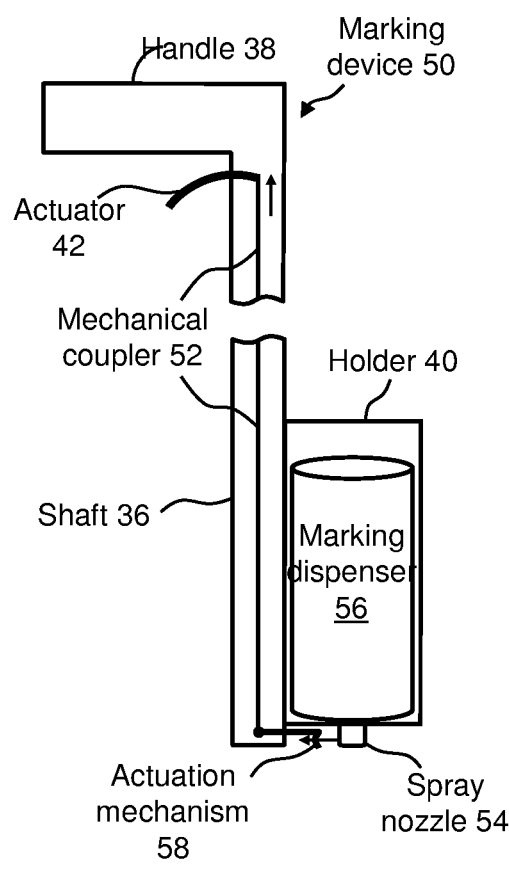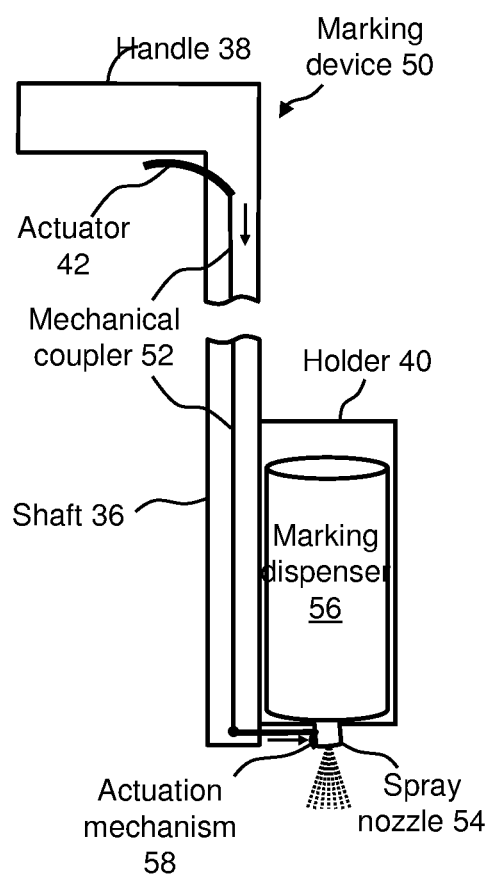
FIG. 3A
(Prior Art)
FIG. 3B
(Prior Art)

Reference histogram 700A (Asphalt)

Reference histogram 700B (Mulch)

Reference histogram 700C (Brick)

Reference histogram 700D (Grass)

Reference histogram 700E (Painted concrete)

Reference histogram 700F (Unpainted concrete)

Input devices 116

METHODS, APPARATUS AND SYSTEMS FOR SURFACE TYPE DETECTION IN CONNECTION WITH LOCATE AND MARKING OPERATIONS

CROSS-REFERENCE TO RELATED APPLICATIONS

This application claims a priority benefit, under 35 U.S.C. §119(e), to U.S. provisional patent application Ser. No. 61/374,034, filed on Aug. 16, 2010, entitled "Methods and Apparatus for Surface Type Detection in Connection with Locate and Marking Operations."

This application also claims a priority benefit, under 35 U.S.C. §119(e), to U.S. provisional patent application Ser. No. 61/373,451, filed on Aug. 13, 2010, entitled "Methods and Apparatus for Surface Type Detection in Connection with Locate and Marking Operations."

This application also claims a priority benefit, under 35 U.S.C. §120, as a continuation-in-part (CIP) of U.S. non-provisional patent application Ser. No. 13/210,237, filed on Aug. 15, 2011, entitled "Methods, Apparatus and Systems for Marking Material Color Detection in Connection with Locate and Marking Operations."

Ser. No. 13/210,237 in turn claims a priority benefit, under 35 U.S.C. §119(e), to U.S. provisional patent application Ser. No. 61/373,475, filed on Aug. 13, 2010, entitled "Methods and Apparatus for Marking Material Color Detection in Connection with Locate and Marking Operations."

Each of the above-identified applications is hereby incorporated herein by reference in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 3110 providing an excavation notice to a one-call center 3120. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Once facilities implicated by the locate request are identified by a one-call center (e.g., via a polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 3140 and/or one or more locate service providers 3130 (who may be acting as contracted agents of the facility owners) so that they can conduct a locate and marking operation to verify a presence or absence of the underground facilities in the dig area. For example, in some instances, a given underground facility owner 3140 may operate its own fleet of locate technicians (e.g., locate technician 3145), in which case the one-call center 3120 may send the ticket to the underground facility owner 3140. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician (e.g., locate technician 3150) to the work site of planned excavation to determine a presence or absence of one or more underground facilities in the dig area to be excavated or otherwise disturbed. A typical first step for the locate technician includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. FIG. 2 illustrates a conventional locate device 3500 (indicated by the dashed box) that includes a transmitter 3505 and a locate receiver 3510. The transmitter 3505 is connected, via a connection point 3525, to a target object (in this example, underground facility 3515) located in the ground 3520. The transmitter generates the applied signal 3530, which is coupled to the underground facility via the connection point (e.g., to a tracer wire along the facility), resulting in the generation of a magnetic field 3535. The magnetic field in turn is detected by the locate receiver 3510, which itself may include one or more detection antenna (not shown). The locate receiver 3510 indicates a presence of a facility when it detects electromagnetic fields arising from the applied signal 3530. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 3A and 3B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 3A and 3B, the mechanical actuation system of the marking device 50 includes an actuator or mechanical trigger 42 proximate to the handle 38 that is actuated/triggered by the technician (e.g, via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 3A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 3B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 3A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Previous efforts at documenting locate operations have focused primarily on locate devices that employ electromagnetic fields to determine the presence of an underground facility. For example, U.S. Pat. No. 5,576,973, naming inventor Alan Haddy and entitled "Apparatus and Method for Obtaining Geographical Positional Data for an Object Located Underground" (hereafter "Haddy"), is directed to a locate device (i.e., a "locator") that receives and stores data from a global positioning system ("GPS") to identify the position of the locate device as an underground object (e.g., a cable) is detected by the locate device. Haddy notes that by recording geographical position data relating to the detected underground object, there is no need to physically mark the location of the underground object on the ground surface, and the recorded position data may be used in the future to re-locate the underground object.

Similarly, U.S. Pat. No. 7,319,387, naming inventors Willson et al. and entitled "GPS Interface for Locating Device" (hereafter "Willson"), is directed to a locate device for locating "position markers," i.e., passive antennas that reflect back RF signals and which are installed along buried utilities. In Willson, a GPS device may be communicatively coupled to the locate device, or alternatively provided as an integral part of the locate device, to store GPS coordinate data associated with position markers detected by the locate device. Electronic memory is provided in the locate device for storing a data record of the GPS coordinate data, and the data record may be uploaded to a remote computer and used to update a mapping database for utilities.

U.S. Publication No. 2006/0282280, naming inventors Stotz et al. and entitled "Ticket and Data Management" (hereafter "Stotz"), also is directed to a locate device (i.e., a "locator") including a GPS receiver. Upon detection of the presence of a utility line, Stotz' locate device can update ticket data with GPS coordinates for the detected utility line. Once the locate device has updated the ticket data, the reconfigured ticket data may be transmitted to a network.

U.S. Publication No. 2007/0219722, naming inventors Sawyer, Jr. et al. and entitled "System and Method for Collecting and Updating Geographical Data" (hereafter "Sawyer"), is directed to collecting and recording data representative of the location and characteristics of utilities and infrastructure in the field for creating a grid or map. Sawyer employs a field data collection unit including a "locating pole" that is placed on top of or next to a utility to be identified and added to the grid or map. The locating pole includes an antenna coupled to a location determination system, such as a GPS unit, to provide longitudinal and latitudinal coordinates of the utility under or next to the end of the locating pole. The data gathered by the field data collection unit is sent to a server to provide a permanent record that may be used for damage prevention and asset management operations.

SUMMARY

Applicants have recognized and appreciated that uncertainties which may be attendant to locate and marking operations may be significantly reduced by collecting various information particularly relating to the marking operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

Furthermore, Applicants have recognized and appreciated that the location at which an underground facility ultimately is detected during a locate operation is not always where the technician physically marks the ground, pavement or other surface during a marking operation; in fact, technician imprecision or negligence, as well as various ground conditions and/or different operating conditions amongst different locate device, may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=potable water; orange=telecommunication lines; yellow=gas, oil, steam); in contrast, in conventional locate devices equipped with GPS capabilities as discussed above, there is no apparent automated provision for readily linking GPS information for a detected facility to the type of facility detected.

Applicants have further appreciated that building a more comprehensive electronic record of information relating to marking operations further facilitates ensuring the accuracy of such operations. For example, Applicants have recognized and appreciated that collecting and analyzing information relating to a type of surface being marked (e.g., dirt, grass, sand, gravel, asphalt, concrete, etc.) may facilitate ensuring accuracy of locate and marking operations, for example, by ensuring that an appropriate type of marking material is applied and/or by detecting undesirable operating conditions.

In view of the foregoing, various inventive embodiments disclosed herein relate generally to systems and methods for surface type detection in connection with locate and marking operations.

In some embodiments, one or more sensors may be employed to collect information regarding a surface, such as a ground surface on which marking material is to be dispensed to mark the presence or absence of an underground facility. The collected sensor data may be analyzed to provide one or more estimates of a type of the surface that is being sensed. For instance, based the sensor data, it may be determined that the surface being sensed is likely to be asphalt, concrete, wood, grass, dirt (or soil), brick, gravel, stone, snow, or any other surface type or combination of surface types.

In some further embodiments, a combination of different sensing and/or analysis techniques may be employed, which may lead to multiple surface type hypotheses for the sensed surface. These hypotheses may be aggregated and/or reconciled to further improve accuracy of surface type detection.

In yet some further embodiments, some of the sensors used to collect data from a surface may be attached to a marking device, so that sensor data may be collected from the surface as it is being marked (or shortly before or after it is marked). Each such sensor may be communicatively coupled to one or more other components of the marking device that are configured to receive and process sensor data.

In summary, one embodiment of the present disclosure is directed to an apparatus for determining a surface type of a surface on which marking material is to be dispensed by a marking device to mark a presence or an absence of at least one underground facility within a dig area, wherein at least a portion of the dig area is planned to be excavated or disturbed during excavation activities. The apparatus comprises: at least one communication interface; at least one memory to store processor-executable instructions; and at least one processor communicatively coupled to the at least one memory and the at least one communication interface. Upon execution of the processor-executable instructions, the at least one processor: A) obtains sensor data relating to the surface to be marked, the sensor data being collected by one or more sensors attached to the marking device; B) retrieves reference data associated with a plurality of surface types; and C) generates surface type information based at least in part on the sensor data and the reference data.

A further embodiment of the present disclosure is directed to a method for use in a system comprising at least one communication interface, at least one memory to store processor-executable instructions, and at least one processor communicatively coupled to the at least one memory and the at least one communication interface. The method may be performed for determining a surface type of a surface on which marking material is to be dispensed by a marking device to mark a presence or an absence of at least one underground facility within a dig area, wherein at least a portion of the dig area is planned to be excavated or disturbed during excavation activities. The method comprises acts of: A) obtaining sensor data relating to the surface to be marked, the sensor data being collected by one or more sensors attached to the marking device; B) retrieving, from the at least one memory, reference data associated with a plurality of surface types; and C) using the at least one processor to generate surface type information based at least in part on the sensor data and the reference data.

Yet a further embodiment of the present disclosure is directed to at least one non-transitory computer-readable storage medium encoded with at least one program including processor-executable instructions that, when executed by at least one processor, perform the above described method for determining a surface type.

Yet a further embodiment of the present disclosure is directed to a marking apparatus for performing a marking operation to mark on a surface a presence or an absence of at least one underground facility. The marking apparatus comprises: at least one actuator to dispense a marking material so as to form at least one locate mark on the surface to mark the presence or the absence of the at least one underground facility; at least one sensor for sensing the surface to be marked; at least one user interface including at least one display device; at least one communication interface; at least one memory to store processor-executable instructions; and at least one processor communicatively coupled to the at least one memory, the at least one communication interface, the at least one user interface, and the at least one actuator. Upon execution of the processor-executable instructions, the at least one processor: A) obtains sensor data relating to the surface to be marked, the sensor data being collected by the at least one sensor; B) retrieves, from the at least one memory, reference data associated with a plurality of surface types; and C) generates surface type information based at least in part on the sensor data and the reference data.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "user" refers to an individual utilizing a locate device and/or a marking device and may include, but is not limited to, land surveyors, locate technicians, and support personnel.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2011-0135163-A1, published Jun. 9, 2011, filed Feb. 16, 2011, and entitled "Methods and Apparatus for Providing Unbuffered Dig Area Indicators on Aerial Images to Delimit Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0198663 A1, published Aug. 5, 2010, filed Feb. 5, 2010, and entitled "Methods and Apparatus for Overlaying Electronic Marking Information on Facilities Map Information and/or Other Image Information Displayed on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0256825-A1, published Oct. 7, 2010, filed Jun. 9, 2010, and entitled "Marking Apparatus Having Operational Sensors For Underground Facility Marking Operations, And Associated Methods And Systems;"

U.S. publication no. 2010-0255182-A1, published Oct. 7, 2010, filed Jun. 9, 2010, and entitled "Marking Apparatus Having Operational Sensors For Underground Facility Marking Operations, And Associated Methods And Systems;"

U.S. publication no. 2010-0245086-A1, published Sep. 30, 2010, filed Jun. 9, 2010, and entitled "Marking Apparatus Configured To Detect Out-Of-Tolerance Conditions In Connection With Underground Facility Marking Operations, And Associated Methods And Systems;"

U.S. publication no. 2010-0247754-A1, published Sep. 30, 2010, filed Jun. 9, 2010, and entitled "Methods and Apparatus For Dispensing Marking Material In Connection With Underground Facility Marking Operations Based on Environmental Information and/or Operational Information;"

U.S. publication no. 2010-0262470-A1, published Oct. 14, 2010, filed Jun. 9, 2010, and entitled "Methods, Apparatus, and Systems For Analyzing Use of a Marking Device By a Technician To Perform An Underground Facility Marking Operation;"

U.S. publication no. 2010-0263591-A1, published Oct. 21, 2010, filed Jun. 9, 2010, and entitled "Marking Apparatus Having Environmental Sensors and Operations Sensors for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2010-0253511-A1, published Oct. 7, 2010, filed Jun. 18, 2010, and entitled "Locate Apparatus Configured to Detect Out-of-Tolerance Conditions in Connection with Underground Facility Locate Operations, and Associated Methods and Systems;"

U.S. publication no. 2010-0257029-A1, published Oct. 7, 2010, filed Jun. 18, 2010, and entitled "Methods, Apparatus, and Systems For Analyzing Use of a Locate Device By a Technician to Perform an Underground Facility Locate Operation;"

U.S. publication no. 2010-0253513-A1, published Oct. 7, 2010, filed Jun. 18, 2010, and entitled "Locate Transmitter Having Enhanced Features For Underground Facility Locate Operations, and Associated Methods and Systems;"

U.S. publication no. 2010-0253514-A1, published Oct. 7, 2010, filed Jun. 18, 2010, and entitled "Locate Transmitter Configured to Detect Out-of-Tolerance Conditions In Connection With Underground Facility Locate Operations, and Associated Methods and Systems;"

U.S. publication no. 2010-0256912-A1, published Oct. 7, 2010, filed Jun. 18, 2010, and entitled "Locate Apparatus for Receiving Environmental Information Regarding Underground Facility Marking Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2010-0205264-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0205031-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0259381-A1, published Oct. 14, 2010, filed Jun. 28, 2010, and entitled "Methods, Apparatus and Systems for Notifying Excavators and Other Entities of the Status of in-Progress Underground Facility Locate and Marking Operations;"

U.S. publication no. 2010-0262670-A1, published Oct. 14, 2010, filed Jun. 28, 2010, and entitled "Methods, Apparatus and Systems for Communicating Information Relating to the Performance of Underground Facility Locate and Marking Operations to Excavators and Other Entities;"

U.S. publication no. 2010-0259414-A1, published Oct. 14, 2010, filed Jun. 28, 2010, and entitled "Methods, Apparatus And Systems For Submitting Virtual White Line Drawings And Managing Notifications In Connection With Underground Facility Locate And Marking Operations;"

U.S. publication no. 2010-0268786-A1, published Oct. 21, 2010, filed Jun. 28, 2010, and entitled "Methods, Apparatus and Systems for Requesting Underground Facility Locate and Marking Operations and Managing Associated Notifications;"

U.S. publication no. 2010-0201706-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205555-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205195-A1, published Aug. 12, 2010, filed Jun. 1, 2009, and entitled "Methods and Apparatus for Associating a Virtual White Line (VWL) Image with Corresponding Ticket Information for an Excavation Project;"

U.S. publication no. 2010-0205536-A1, published Aug. 12, 2010, filed Jun. 1, 2009, and entitled "Methods and Apparatus for Controlling Access to a Virtual White Line (VWL) Image for an Excavation Project;"

U.S. publication no. 2010-0228588-A1, published Sep. 9, 2010, filed Feb. 11, 2010, and entitled "Management System, and Associated Methods and Apparatus, for Providing Improved Visibility, Quality Control and Audit Capability for Underground Facility Locate and/or Marking Operations;"

U.S. publication no. 2010-0324967-A1, published Dec. 23, 2010, filed Jul. 9, 2010, and entitled "Management System, and Associated Methods and Apparatus, for Dispatching Tickets, Receiving Field Information, and Performing A Quality Assessment for Underground Facility Locate and/or Marking Operations;"

U.S. publication no. 2010-0318401-A1, published Dec. 16, 2010, filed Jul. 9, 2010, and entitled "Methods and Apparatus for Performing Locate and/or Marking Operations with Improved Visibility, Quality Control and Audit Capability;"

U.S. publication no. 2010-0318402-A1, published Dec. 16, 2010, filed Jul. 9, 2010, and entitled "Methods and Apparatus for Managing Locate and/or Marking Operations;"

U.S. publication no. 2010-0318465-A1, published Dec. 16, 2010, filed Jul. 9, 2010, and entitled "Systems and Methods for Managing Access to Information Relating to Locate and/or Marking Operations;"

U.S. publication no. 2010-0201690-A1, published Aug. 12, 2010, filed Apr. 13, 2009, and entitled "Virtual White Lines (VWL) Application for Indicating a Planned Excavation or Locate Path;"

U.S. publication no. 2010-0205554-A1, published Aug. 12, 2010, filed Apr. 13, 2009, and entitled "Virtual White Lines (VWL) Application for Indicating an Area of Planned Excavation;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2011-0060496-A1, published Mar. 10, 2011, filed Aug. 10, 2010, and entitled "Systems and Methods for Complex Event Processing of Vehicle Information and Image Information Relating to a Vehicle.;"

U.S. publication no. 2011-0093162-A1, published Apr. 21, 2011, filed Dec. 28, 2010, and entitled "Systems And Methods For Complex Event Processing Of Vehicle-Related Information;"

U.S. publication no. 2011-0093306-A1, published Apr. 21, 2011, filed Dec. 28, 2010, and entitled "Fleet Management Systems And Methods For Complex Event Processing Of Vehicle-Related Information Via Local And Remote Complex Event Processing Engines;"

U.S. publication no. 2011-0093304-A1, published Apr. 21, 2011, filed Dec. 29, 2010, and entitled "Systems And Methods For Complex Event Processing Based On A Hierarchical Arrangement Of Complex Event Processing Engines;"

U.S. publication no. 2010-0257477-A1, published Oct. 7, 2010, filed Apr. 2, 2010, and entitled "Methods, Apparatus, and Systems for Documenting and Reporting Events Via Time-Elapsed Geo-Referenced Electronic Drawings;"

U.S. publication no. 2010-0256981-A1, published Oct. 7, 2010, filed Apr. 2, 2010, and entitled "Methods, Apparatus, and Systems for Documenting and Reporting Events Via Time-Elapsed Geo-Referenced Electronic Drawings;"

U.S. publication no. 2010-0205032-A1, published Aug. 12, 2010, filed Feb. 11, 2010, and entitled "Marking Apparatus Equipped with Ticket Processing Software for Facilitating Marking Operations, and Associated Methods;"

U.S. publication no. 2011-0035251-A1, published Feb. 10, 2011, filed Jul. 15, 2010, and entitled "Methods, Apparatus, and Systems for Facilitating and/or Verifying Locate and/or Marking Operations;"

U.S. publication no. 2011-0035328-A1, published Feb. 10, 2011, filed Jul. 15, 2010, and entitled "Methods, Apparatus, and Systems for Generating Technician Checklists for Locate and/or Marking Operations;"

U.S. publication no. 2011-0035252-A1, published Feb. 10, 2011, filed Jul. 15, 2010, and entitled "Methods, Apparatus, and Systems for Processing Technician Checklists for Locate and/or Marking Operations;"

U.S. publication no. 2011-0035324-A1, published Feb. 10, 2011, filed Jul. 15, 2010, and entitled "Methods, Apparatus, and Systems for Generating Technician Workflows for Locate and/or Marking Operations;"

U.S. publication no. 2011-0035245-A1, published Feb. 10, 2011, filed Jul. 15, 2010, and entitled "Methods, Apparatus, and Systems for Processing Technician Workflows for Locate and/or Marking Operations;"

U.S. publication no. 2011-0035260-A1, published Feb. 10, 2011, filed Jul. 15, 2010, and entitled "Methods, Apparatus, and Systems for Quality Assessment of Locate and/or Marking Operations Based on Process Guides;"

U.S. publication no. 2010-0256863-A1, published Oct. 7, 2010, filed Apr. 2, 2010, and entitled "Methods, Apparatus, and Systems for Acquiring and Analyzing Vehicle Data and Generating an Electronic Representation of Vehicle Operations;"

U.S. publication no. 2011-0022433-A1, published Jan. 27, 2011, filed Jun. 24, 2010, and entitled "Methods and Apparatus for Assessing Locate Request Tickets;"

U.S. publication no. 2011-0040589-A1, published Feb. 17, 2011, filed Jul. 21, 2010, and entitled "Methods and Apparatus for Assessing Complexity of Locate Request Tickets;"

U.S. publication no. 2011-0046993-A1, published Feb. 24, 2011, filed Jul. 21, 2010, and entitled "Methods and Apparatus for Assessing Risks Associated with Locate Request Tickets;"

U.S. publication no. 2011-0046994-A1, published Feb. 17, 2011, filed Jul. 21, 2010, and entitled "Methods and Apparatus for Multi-Stage Assessment of Locate Request Tickets;"

U.S. publication no. 2011-0040590-A1, published Feb. 17, 2011, filed Jul. 21, 2010, and entitled "Methods and Apparatus for Improving a Ticket Assessment System;"

U.S. publication no. 2011-0020776-A1, published Jan. 27, 2011, filed Jun. 25, 2010, and entitled "Locating Equipment for and Methods of Simulating Locate Operations for Training and/or Skills Evaluation;"

U.S. publication no. 2010-0285211-A1, published Nov. 11, 2010, filed Apr. 21, 2010, and entitled "Method Of Using Coded Marking Patterns In Underground Facilities Locate Operations;"

U.S. publication no. 2011-0137769-A1, published Jun. 9, 2011, filed Nov. 5, 2010, and entitled "Method Of Using Coded Marking Patterns In Underground Facilities Locate Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2011-0007076-A1, published Jan. 13, 2011, filed Jul. 7, 2010, and entitled, "Methods, Apparatus and Systems for Generating Searchable Electronic Records of Underground Facility Locate and/or Marking Operations;"

U.S. publication no. 2011-0131081-A1, published Jun. 2, 2011, filed Oct. 29, 2010, and entitled "Methods, Apparatus, and Systems for Providing an Enhanced Positive Response in Underground Facility Locate and Marking Operations;"

U.S. publication no. 2011-0060549-A1, published Mar. 10, 2011, filed Aug. 13, 2010, and entitled, "Methods and Apparatus for Assessing Marking Operations Based on Acceleration Information;"

U.S. publication no. 2011-0117272-A1, published May 19, 2011, filed Aug. 19, 2010, and entitled, "Marking Device with Transmitter for Triangulating Location During Locate Operations;"

U.S. publication no. 2011-0045175-A1, published Feb. 24, 2011, filed May 25, 2010, and entitled, "Methods and Marking Devices with Mechanisms for Indicating and/or Detecting Marking Material Color;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2011-0095885 A9 (Corrected Publication), published Apr. 28, 2011, and entitled, "Methods And Apparatus For Generating Electronic Records Of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;"

U.S. publication no. 2010-0085054 A1, published Apr. 8, 2010, filed Sep. 30, 2009, and entitled, "Systems and Methods for Generating Electronic Records of Locate And Marking Operations;" and U.S. publication no. 2011-0046999-A1, published Feb. 24, 2011, filed Aug. 4, 2010, and entitled, "Methods and Apparatus for Analyzing Locate and Marking Operations by Comparing Locate Information and Marking Information."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIGS. 3A and 3B illustrate a conventional marking device in an actuated and non-actuated state, respectively.

DETAILED DESCRIPTION

Figure 1:
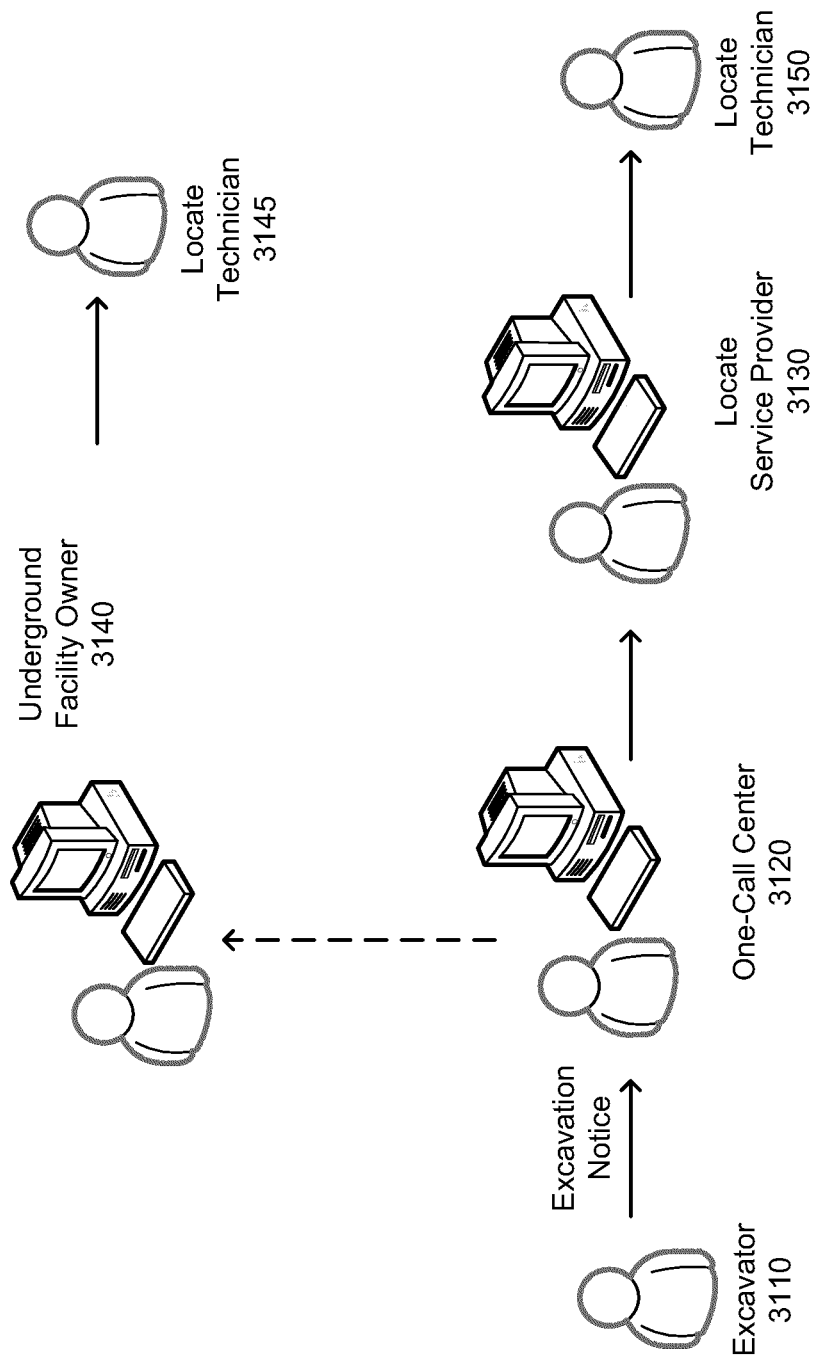
FIG. 1 shows an example in which a locate and marking operation is initiated as a result of an excavator providing an excavation notice to a one-call center.
Figure 2:
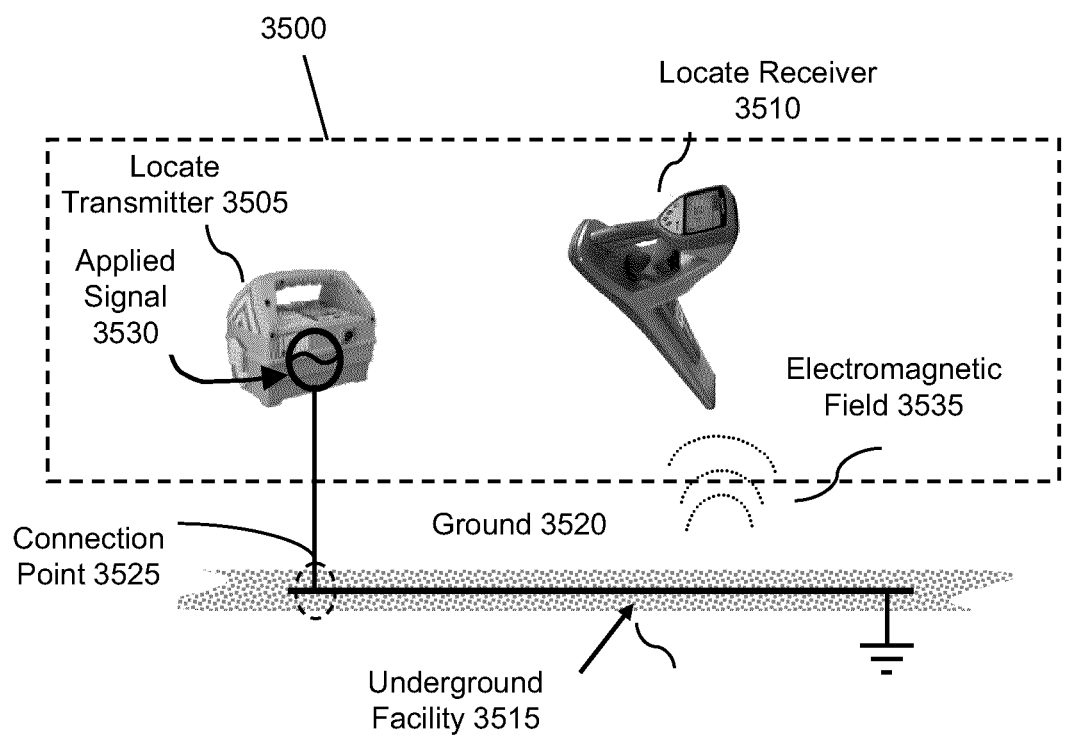
FIG. 2 illustrates one example of a conventional locate instrument set including a locate transmitter and a locate receiver.

Applicants have recognized and appreciated that collecting and analyzing information relating to a type of surface being marked (e.g., dirt, grass, sand, gravel, asphalt, concrete, etc.) may facilitate ensuring accuracy of locate and marking operations. For example, Applicants have recognized and appreciated that collecting and analyzing surface type information may facilitate ensuring that an appropriate type of marking material is applied. As a more specific example, some municipalities require that marking paint dispensed on streets and/or sidewalks fade away within a specified period of time (e.g., two to three weeks), so as to reduce any negative impact on the aesthetic appearance of the streets and/or sidewalks. Therefore, it may be beneficial to detect whether the type of surface being marked is pavement (e.g., asphalt or concrete, as opposed to dirt, grass, gravel, or sand) and, accordingly, select an appropriate formulation of marking material. As another example, some jurisdictions (e.g., federal, state, county, and/or municipality) require that locate marks remain recognizable for at least some period of time (e.g., 10 to 14 days). Therefore, in some circumstances (e.g., during summer or some other growing season), it may be beneficial to detect whether the type of surface being marked is grass and, if so, use a type of marking material (e.g., flags) other than paint. Such surface type detection may be performed at the beginning of a marking operation, and/or on an on-going basis throughout the marking operation. For example, if a surface type transition (e.g., from pavement to grass or vice versa) is detected, an alert may be generated to remind the technician to change to an appropriate type of marking material.

As another example, Applicants have recognized and appreciated that collecting and analyzing surface type information may facilitate detecting undesirable operating conditions. For instance, if the humidity of the operating environment is too great, marking material such as paint may not adequately dry, or it may not remain in place on the surface on which it is dispensed. Furthermore, acceptable ranges of humidity may differ depending on the type of surface being marked (e.g., a humidity tolerance for grass may be lower than that for concrete or dirt). Therefore, detecting the type of surface being marked may facilitate determining whether current operating conditions (e.g., humidity) are within acceptable limits.

Accordingly, systems, methods, and apparatus are provided herein for performing surface type detection in connection with locate and marking operations.

In some embodiments, one or more sensors may be employed to collect information regarding a surface, such as a ground surface on which marking material is to be dispensed to mark the presence or absence of an underground facility. The collected sensor data may be analyzed to provide an estimate of a type of the surface that is being sensed. For instance, based on the sensor data, it may be determined that the surface being sensed is likely to be asphalt, concrete, wood, grass, dirt (or soil), brick, gravel, stone, snow, or any other surface type or combination of surface types.

Various techniques may be used to process and analyze sensor data for purposes of surface type detection. For instance, in some embodiments, the sensor data collected from a surface (or some representative data derived the sensor data) may be compared against some previously stored reference data to identify one or more likely surface types for the sensed surface. As a more specific example, a surface signature may be derived from the sensor data and compared against a list of reference signatures associated respectively with a list of different surface types, so as to identify one or more candidate surface types whose references signatures mostly closely match the surface signature. A confidence score may be computed for each candidate surface type based on the extent to which the surface signature matches the reference signature corresponding to that candidate surface type.

As used herein, the term "signature" may be refer to any suitable set of representative data that can be used to identify a surface type for a sensed surface. In some illustrative implementations, a signature may contain part or all of the raw sensor data collected from a surface. Alternatively, or additionally, a signature may contain one or more results of transforming, filtering, augmenting, aggregating, and/or interpreting the raw sensor data in any suitable manner. Although specific examples of signatures are discussed in greater detail below, it should be appreciated that other types of signatures may also be suitable, depending on the sensing and analysis techniques that are employed in each specific implementation.

Various types of sensors may be used collect information regarding a surface and may operate based on different physical principles. For instance, some sensors are designed to detect radiation in one or more portions of the electromagnetic (EM) spectrum, whereas other sensors are designed to detect sound waves. Sensors based on other physical principles may also be suitable, as aspects of the present disclosure relating to sensing are not limited to any particular types of sensors.

As a specific example, a conventional still-image or video camera may be used as a sensor that detects visible light reflecting from a surface. Alternatively, various embodiments may use other image detection hardware, including, but not limited to color-sensing chips, optical flow chips, and the like. One or more images of the surface captured by the camera may be analyzed using some suitable image analysis software to identify one or more characteristics (e.g., color, intensity, randomness, presence/absence of features such as lines, etc.) that may be indicative of a surface type. An identified characteristic (e.g., the color "green") may be used as a signature of the sensed surface and may be compared against a list of reference signatures (e.g., "green" for grass, "red" for brick, "black" for asphalt, etc.) to identify a candidate surface type for the sensed surface (e.g., grass).

As another example, one or more radiation sensors may be employed to measure an amount of electromagnetic radiation reflected by a surface at each of one or more selected wavelengths or ranges of wavelengths (e.g., visible light, infrared, ultraviolet, etc.). The source of the radiation may be natural sun light and/or an artificial light source configured to operate in conjunction with the radiation sensors (e.g., a calibrated light source emitting light at a specific wavelength or range of wavelengths, such as a broad spectrum IR light emitting diode). The collected sensor data (e.g., a percentage of radiation reflected by the surface at each selected wavelength or range of wavelengths) may be used as a spectral signature of the sensed surface and may be compared against a list of reference spectral signatures corresponding respectively to various surface types.

As yet another example, a thermal sensor may be employed to measure the temperature of a surface by detecting infrared (IR) radiation from the surface. As yet another example, a sonar sensor may be employed to measure sound waves reflected by the sensed surface. Illustrative uses of these sensors for purposes of surface type detection are discussed in greater detail below, for example, in connection with FIGS. 8-9.

In some further embodiments, a combination of different sensing and/or analysis techniques may be employed, which may lead to multiple surface type hypotheses for the sensed surface. These hypotheses may be aggregated and/or reconciled to further improve accuracy of surface type detection. For example, a confidence score for a candidate surface type may be increased if it is identified by two independent sensing and/or analysis techniques as a likely match for the sensed surface. As another example, a first matching surface type identified by a first sensing and/or analysis technique may be selected over a second matching surface type identified by a second sensing and/or analysis technique if the confidence score assigned to the first matching surface type by the first sensing and/or analysis technique is higher than the confidence score assigned to the second matching surface type by the second sensing and/or analysis technique. More generally, each candidate surface type may be assigned a composite (or aggregate) confidence score based on the confidence scores assigned to that candidate surface type under different sensing and/or analysis techniques, and a candidate surface type having a highest composite confidence score may be identified as a top surface type hypothesis for the sensed surface. For instance, in some implementations, the composite confidence score may be a weighted sum of the component confidence scores, using weights associated respectively with the different sensing and/or analysis techniques.

In yet some further embodiments, some of the sensors used to collect data from a surface may be attached to a marking device (e.g., the marking device 50 shown in FIGS. 3A-B), so that sensor data may be collected from the surface as it is being marked (or shortly before or after it is marked). Each such sensor may be attached to the marking device externally (e.g., outside a housing of the marking device) or internally (e.g., inside a housing of the marking device), and may be communicatively coupled to one or more other components of the marking device that are configured to receive and process sensor data. For example, a sensor may be communicatively coupled to a processor and a memory of the marking device, so that sensor data can be stored in the memory and analyzed by the processor. Additionally, or alternatively, the sensor data may be transmitted via a communication interface of the marking device to another computer for storage and/or analysis.

Applicants have further recognized and appreciated that the output of surface type detection (e.g., one or more surface type hypotheses) may be used by one or more other applications related to the management of locate and marking operations. For example, in one implementation, a surface type detection output may be used by a workflow application to automatically select and/or recommend an appropriate type of marking material to be applied to the sensed surface. In another implementation, a surface type detection output may be used by a quality control application to determine whether certain adverse operating condition exists (e.g., whether the humidity is too high for applying paint, or whether there is ice on the surface to be marked). The quality control application may react in real time to the detection of an adverse condition, for example, by sending an alert to a technician performing the locate and marking operation. Alternatively, or additionally, the quality control application may flag the incident as requiring further review, and a supervisor may determine whether any corrective action (e.g., a re-mark operation) may be needed and/or whether the technician should receive additional training.

In some instances, the information collected during the marking operation may also be examined by a regulator and/or an insurer for auditing purposes (e.g., to verify whether the locate and marking operation has been proper conducted). As another example, the electronic record may be analyzed during damage investigation in the event of an accident during subsequent excavation (e.g., as evidence that a certain type of marking material was dispensed at a certain location).

Following below are more detailed descriptions of various concepts related to, and embodiments of, inventive systems, methods and apparatus for surface type detection in connection with locate and marking operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In some illustrative embodiments, a marking device is provided that has a camera system and image analysis software installed therein for determining a type of surface being marked or traversed (hereafter called imaging-enabled marking device). In alternative embodiments, image analysis software may be located elsewhere, such as a separate computer processing unit on the marking device, or a remote server in communication with the marking device by wireless communication technology. In still further embodiments the marking device also may collect data onto a local storage medium for later analysis, which may later be transferred to a computer system for processing, e.g., over USB. Examples of types of surfaces that may be identified using the imaging-enabled marking device may include, but are not limited to, asphalt, concrete, wood, grass, dirt (or soil), brick, gravel, stone, snow, and the like. Additionally, some types of surfaces may be painted or unpainted (e.g., painted concrete vs. unpainted concrete). More than one type of surface may be present at a jobsite.

The image analysis software may include any one or more algorithms that are useful for automatically determining a type of surface being marked or traversed. More specifically, image analysis software may execute one or more distinct processes for incrementally determining and/or otherwise confirming a level of confidence of matching a certain surface type with a surface being marked or traversed. By way of example, the execution of a certain algorithm may determine a certain level of confidence of the surface being unpainted concrete. The execution of another type of algorithm may confirm, validate, verify, and/or otherwise support the results of the first algorithm and, thereby, increase the level of confidence of the surface being unpainted concrete. The execution of yet another type of algorithm may confirm, validate, verify, and/or otherwise support the results of the first and second algorithms and, thereby, further increase the level of confidence of the surface being unpainted concrete, and so on until a final confidence level of the surface type is determined.

Additionally, for each algorithm, once a level of confidence of matching is determined, for example, in the form of a numerical confidence score, the image analysis software may be capable of dynamically setting a weight factor to be applied to the confidence score. A final confidence score may be calculated based on the individual confidence scores output by the one or more algorithms of image analysis software and the associated weight factors.

In certain embodiments, the camera system may include one or more digital video cameras. In one example, the process of automatically determining a type of surface being marked or traversed may be based on sensing motion of the imaging-enabled marking device. That is, any time that imaging-enabled marking device is in motion, at least one of the digital video cameras may be activated and processing of image data may occur, such as the processing of pixel intensities and/or color coordinates.

In other embodiments, other devices may be used in combination with the camera system. These other devices may include, but are not limited to, one or more the following types of sensors, configured to collect sensor data either independently or in one or more suitable combinations: sonar sensor, inertial measurement unit, infrared sensor, temperature sensor, light sensor, and digital audio recorder.

Figure 4:
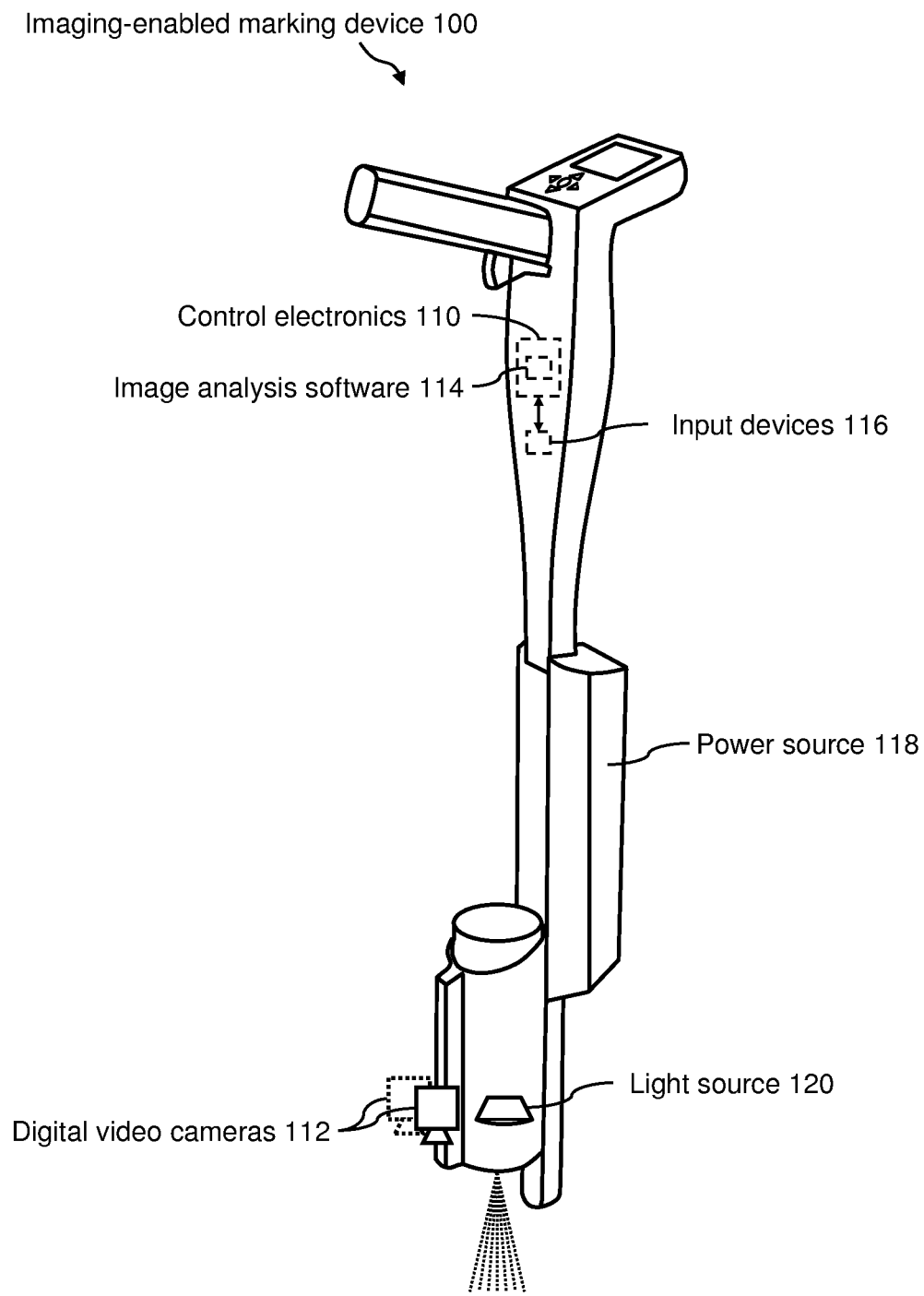
FIG. 4 shows a perspective view of an example of an imaging-enabled marking device that has a camera system and image analysis software installed therein for determining a type of surface being marked or traversed, according to some embodiments of the present disclosure.

Referring to FIG. 4, a perspective view of an example of an imaging-enabled marking device 100 that has a camera system and image analysis software installed therein for determining a type of surface being marked or traversed is presented. More specifically, FIG. 4 shows an imaging-enabled marking device 100 that is an electronic marking device capable of determining a type of surface being marked or traversed using a camera system and image analysis software that is installed therein.

In one example, the imaging-enabled marking device 100 may include certain control electronics 110 and one or more digital video cameras 112. The control electronics 110 may be used for managing the overall operations of the imaging-enabled marking device 100. More details of an example of the control electronics 110 are described with reference to FIG. 5.

The one or more digital video cameras 112 may be any standard digital video cameras that have a frame rate and resolution that is suitable for use in the imaging-enabled marking device 100. Each digital video camera 112 may be a universal serial bus (USB) digital video camera. In one example, each digital video camera 112 may be the Sony PlayStation®Eye video camera that has a 10-inch focal length and is capable of capturing 60 frames/second, where each frame is, for example, 640×480 pixels. In this example, a suitable placement of digital video camera 112 on imaging-enabled marking device 100 may be about 10 to 13 inches from the surface to be marked or traversed, when the marking device 100 is held by a technician during normal use. Certain frames of the image data (e.g., every $n^{th}$ frame) from digital video camera 112 may be stored in any standard or proprietary image file format (e.g., JPEG, BMP, TIFF, etc.).

Information from more than one digital video camera 112 may be useful to image analysis software 114 for providing more image data to process when determining a type of surface being marked or traversed by imaging-enabled marking device 100. By way of example, imaging-enabled marking device 100 may include a configuration of two digital video cameras 112. With respect to the body of imaging-enabled marking device 100, the two digital video cameras 112 may be mounted in any useful configuration, such as side-by-side, one behind the other, in the same plane, not in the same plane, or any combinations thereof. Preferably, the fields of view (FOV) of both digital video cameras 112 have some amount of overlap, regardless of the mounting configuration.

Certain image analysis software 114 may reside at and execute on the control electronics 110 of the imaging-enabled marking device 100. The image analysis software 114 may be any suitable image analysis software for processing digital video output (e.g., from at least one digital video camera 112). In order to conserve processing resources of the control electronics 110, the image analysis software 114 may perform image analysis processes on, for example, every $n^{th}$ frame (e.g., every $5^{th}$, $10^{th}$ or $20^{th}$ frame) of the image data from the digital video camera 112. The image analysis software 114 may include, for example, one or more algorithms for performing any useful image analysis processes with respect to determining a type of surface being marked or traversed from digital video that is captured using the digital video camera 112. More details of examples of algorithms that may be implemented in the image analysis software 114 are described with reference to FIG. 5.

The imaging-enabled marking device 100 may include one or more devices for use in combination with the digital video cameras 112 and the image analysis software 114. For example, certain input devices 116 may be integrated into or otherwise connected to the control electronics 110. Input devices 116 may be, for example, any systems, sensors, and/or devices that are useful for acquiring and/or generating data that may be used in combination with the digital video cameras 112 and the image analysis software 114 for determining a type of surface being marked or traversed, according to the present disclosure. More details of examples of input devices 116 are described with reference to FIG. 8.

The components of the imaging-enabled marking device 100 may be powered by a power source 118. The power source 118 may be any power source that is suitable for use in a portable device, such as, but not limited to, one or more rechargeable batteries, one or more non-rechargeable batteries, a solar electrovoltaic panel, a standard AC power plug feeding an AC-to-DC converter, and the like.

FIG. 4 also shows that the imaging-enabled marking device 100 may include a light source 120. In one example, the light source 120 is a white light source that is powered by the power source 118. The light source 120 may be used for illuminating the surface to be marked or traversed.

Figure 5:
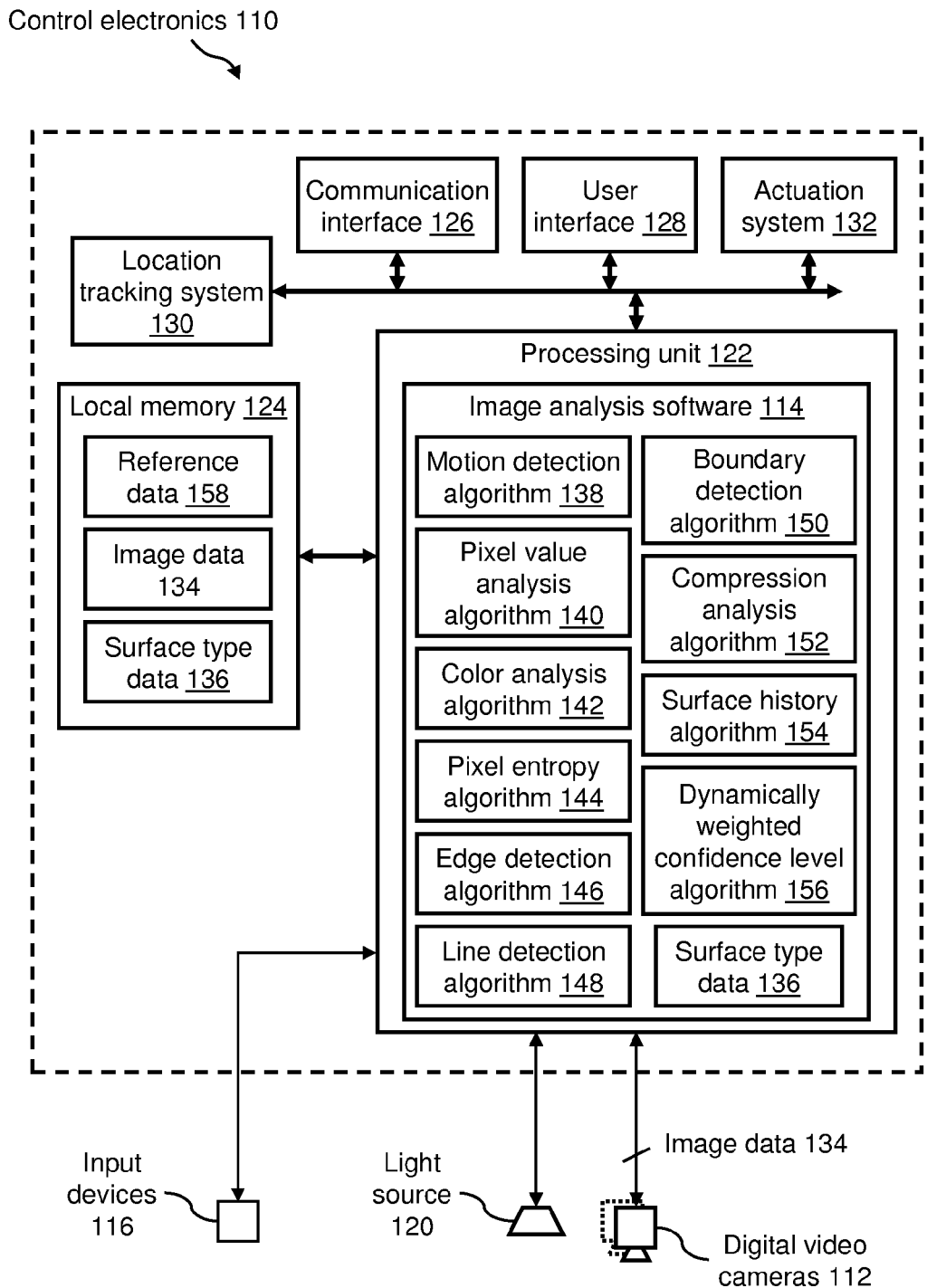
FIG. 5 illustrates a functional block diagram of an example of control electronics of an imaging-enabled marking device, according to some embodiments of the present disclosure.

Referring to FIG. 5, a functional block diagram of an example of the control electronics 110 of the imaging-enabled marking device 100 of the present disclosure is presented. In this example, control electronics 110 may include, but is not limited to, the image analysis software 114 shown in FIG. 4, a processing unit 122, a quantity of local memory 124, a communication interface 126, a user interface 128, a location tracking system 130, and an actuation system 132.

The image analysis software 114 may be executed by the processing unit 122. The processing unit 122 may be any general-purpose processor, controller, or microcontroller device that is capable of managing the overall operations of the imaging-enabled marking device 100, including managing data that is returned from any component thereof. The local memory 124 may be any volatile or non-volatile data storage device, such as, but not limited to, a random access memory (RAM) device or a removable memory device (e.g., a USB flash drive).

The communication interface 126 may be any wired and/or wireless communication interface for connecting to a network (e.g., a local area network such as an enterprise intranet, a wide area network, or the Internet) and by which information (e.g., the contents of the local memory 124) may be exchanged with other devices connected to the network. Examples of wired communication interfaces may be implemented according to various interface protocols, including, but not limited to, USB protocols, RS232 protocol, RS422 protocol, IEEE 1394 protocol, Ethernet protocols, optical protocols (e.g., relating to communications over fiber optics), and any combinations thereof. Examples of wireless communication interfaces may be implemented according to various wireless technologies, including, but not limited to, Bluetooth®, ZigBee®, Wi-Fi/IEEE 802.11, Wi-Max, various cellular protocols, Infrared Data Association (IrDA) compatible protocols, Shared Wireless Access Protocol (SWAP), and any combinations thereof.

The user interface 128 may be any mechanism or combination of mechanisms by which a user may operate the imaging-enabled marking device 100 and by which information that is generated by the imaging-enabled marking device 100 may be presented to the user. For example, the user interface 128 may include, but is not limited to, a display, a touch screen, one or more manual pushbuttons, one or more light-emitting diode (LED) indicators, one or more toggle switches, a keypad, an audio output (e.g., speaker, buzzer, or alarm), a wearable interface (e.g., data glove), and any combinations thereof.

The location tracking system 130 may include any device that can determine its geographical location to a certain degree of accuracy. For example, the location tracking system 130 may include a global positioning system (GPS) receiver, such as a global navigation satellite system (GNSS) receiver. A GPS receiver may provide, for example, any standard format data stream, such as a National Marine Electronics Association (NMEA) data stream. The location tracking system 130 may also include an error correction component (not shown), which may be any mechanism for improving the accuracy of the geo-location data.

The actuation system 132 may include a mechanical and/or electrical actuator mechanism (not shown) that may be coupled to an actuator that causes the marking material to be dispensed from the marking dispenser of the imaging-enabled marking device 100. Actuation means starting or causing the imaging-enabled marking device 100 to work, operate, and/or function. Examples of actuation may include, but are not limited to, any local or remote, physical, audible, inaudible, visual, non-visual, electronic, electromechanical, biomechanical, biosensing or other signal, instruction, or event. Actuations of the imaging-enabled marking device 100 may be performed for any purpose, such as, but not limited to, dispensing marking material and capturing any information of any component of the imaging-enabled marking device 100 without dispensing marking material. In one example, an actuation may occur by pulling or pressing a physical trigger of the imaging-enabled marking device 100 that causes the marking material to be dispensed.

FIG. 5 also shows one or more digital video cameras 112 connected to the control electronics 110 of the imaging-enabled marking device 100. In particular, image data 134 from the digital video cameras 112 may be passed (e.g., frame by frame) to the processing unit 122 and processed by the image analysis software 114. In one example, every $n^{th}$ frame (e.g., every $5^{th}$, $10^{th}$ or $20^{th}$ frame) of the image data 134 may be processed and stored in the local memory 124. In this way, the processing capability of the processing unit 122 may be optimized. FIG. 5 shows that the image analysis software 114 may include one or more algorithms, which may be any task-specific algorithms with respect to processing the digital video output of digital video cameras 112 for determining a type of surface being marked or traversed. The results of executing the operations of the image analysis software 114 may be compiled into surface type data 136, which may also be stored in the local memory 124.

Examples of these task-specific algorithms that may be part of the image analysis software 114 include, but are not limited to, a motion detection algorithm 138, a pixel value analysis algorithm 140, a color analysis algorithm 142, a pixel entropy algorithm 144, an edge detection algorithm 146, a line detection algorithm 148, a boundary detection algorithm 150, a compression analysis algorithm 152, a surface history algorithm 154, and a dynamically weighted confidence level algorithm 156. One reason for executing multiple algorithms in the process of determining a type of surface being marked or traversed may be that any given single algorithm may be more or less effective for determining certain types of surfaces. Therefore, the collective output of multiple algorithms is useful for making a final determination of a type of surface being marked or traversed, which is further described with reference to the method of FIG. 9.

Certain predetermined reference data 158 may be stored in the local memory 124. The contents of the reference data 158 may be any information that is useful to the image analysis software 114 and, in particular, to the motion detection algorithm 138, the pixel value analysis algorithm 140, the color analysis algorithm 142, the pixel entropy algorithm 144, the edge detection algorithm 146, the line detection algorithm 148, the boundary detection algorithm 150, the compression analysis algorithm 152, the surface history algorithm 154, and the dynamically weighted confidence level algorithm 156, and any combinations thereof. An example of the contents of the reference data 158 is shown in FIG. 6.

Figure 6:
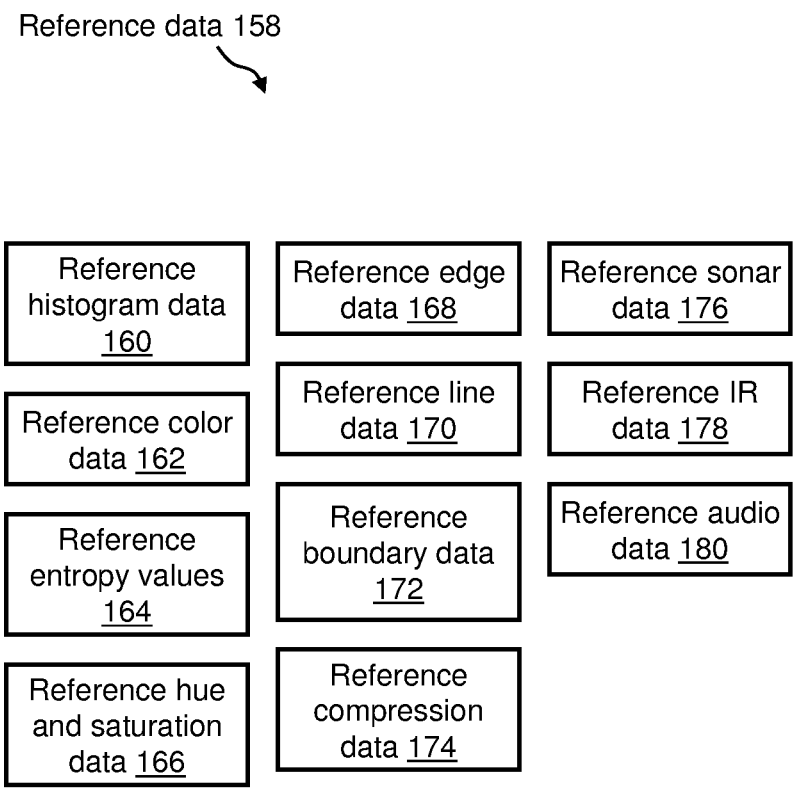
FIG. 6 illustrates a functional block diagram of an example of reference data that is stored locally at an imaging-enabled marking device, according to some embodiments of the present disclosure.

Referring to FIG. 6, a functional block diagram of an example of the reference data 158 that is stored locally at the imaging-enabled marking device is presented. In this example, the reference data 158 includes, but is not limited to: reference histogram data 160, which is associated with the pixel value analysis algorithm 140; reference color data 162, which is associated with the color analysis algorithm 142; reference entropy values 164, which is associated with the pixel entropy algorithm 144; reference hue and saturation data 166, which is also associated with the color analysis algorithm 142; reference edge data 168, which is associated with the edge detection algorithm 146; reference line data 170, which is associated with the line detection algorithm 148; reference boundary data 172, which is associated with the boundary detection algorithm 150; reference compression data 174, which is associated with the compression analysis algorithm 152; and any combinations thereof. Referring to FIGS. 5 and 6, the operation of the algorithms of the image analysis software 114 and the associated the reference data 158 may be summarized as follows.

The motion detection algorithm 138 may be any algorithm for processing information from any mechanism that may be used for determining whether the imaging-enabled marking device 100 is in motion. In one example, the motion detection algorithm 138 may query readings from an inertial measurement unit (IMU), which is one example of an input device 116. The IMU indicates, for example, the start and end of motion with respect to the imaging-enabled marking device 100. More details of an example of an IMU are described with reference to FIG. 10. In another example, the motion detection algorithm 138 may query the output of an optical flow algorithm (not shown) that is used to process the image data 134 from at least one digital video camera 112 and determine whether imaging-enabled marking device 100 is in motion. An optical flow algorithm performs an optical flow calculation, which is well known, for determining the pattern of apparent motion of the source digital video camera 112 and, thereby, determines when the imaging-enabled marking device 100 is in motion. In one example, the optical flow algorithm may be based on the Pyramidal Lucas-Kanade method for performing the optical flow calculation. In yet another example, the motion detection algorithm 138 may use the combination of an IMU and the optical flow algorithm to determine whether the imaging-enabled marking device 100 is in motion.

In one example, the digital video cameras 112 are activated only when it is sensed that the imaging-enabled marking device 100 is in motion. This mode of operation may allow surface detection regardless of whether marking material is being dispensed. In another example, only when the motion detection algorithm 138 indicates that the imaging-enabled marking device 100 is in motion are the digital video cameras 112 activated.

In another example, the digital video cameras 112 and associated operations of the image analysis software 114 may be actuation-based, i.e., based on the state of the actuation system 132. For example, each time the physical trigger of the imaging-enabled marking device 100 is pulled or pressed, the digital video cameras 112 and associated operations of the image analysis software 114 are activated. This alternative mode of operation may allow surface detection only when marking material is being dispensed.

In yet another example, the digital video cameras 112 and associated operations of image analysis software 114 may be started and stopped by any mechanisms, such as manually by the user or by programming. In yet another example, once processes of image analysis software 114 are initiated the software may be programmed to run for a certain amount of time (e.g., a few seconds). In any case, once digital video camera 112 is activated, image analysis software 114 may be programmed to process every $n^{th}$ frame (e.g., every $5^{th}$, $10^{th}$ or $20^{th}$ frame) of image data 134.

The pixel value analysis algorithm 140 may be used to generate a grayscale luminance distribution histogram of the current surface being marked or traversed. The pixel value analysis algorithm 140 may then compare the current grayscale luminance distribution histogram to the reference histogram data 160 stored in the reference data 158. Applicants have recognized and appreciated that certain types of surfaces may have respective characteristic grayscale luminance distributions. Accordingly, the reference histogram data 160 may include a set of characteristic grayscale luminance distributions for certain types of surfaces. The output of the pixel value analysis algorithm 140 may include a confidence level of the current surface matching a certain surface type, as described with reference to FIG. 9, wherein this confidence level is derived based on grayscale luminance distributions.

Figure 7A:
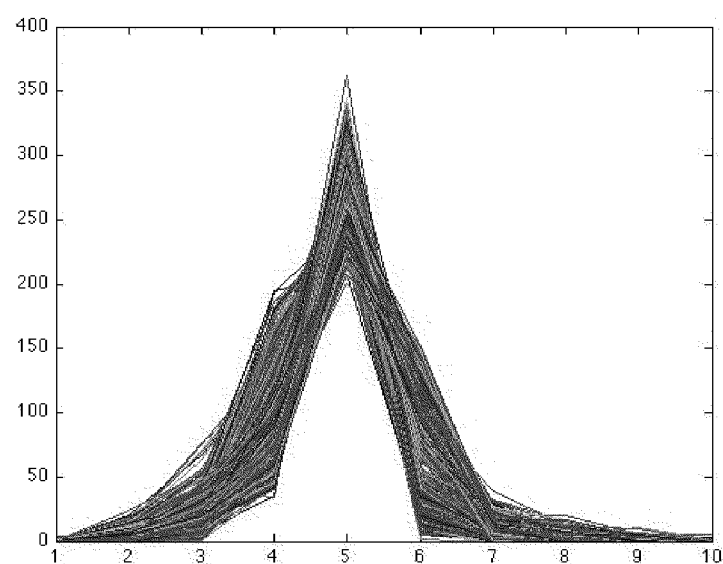
FIGS. 7A-F illustrate examples of reference histograms that represent reference grayscale luminance distributions, which may be useful for determining a type of surface being marked or traversed, according to some embodiments of the present disclosure.
Figure 7B:
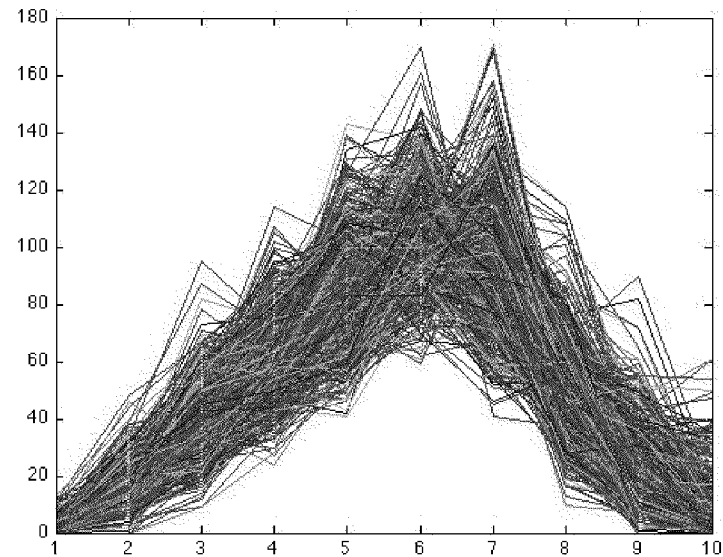
Figure 7C:
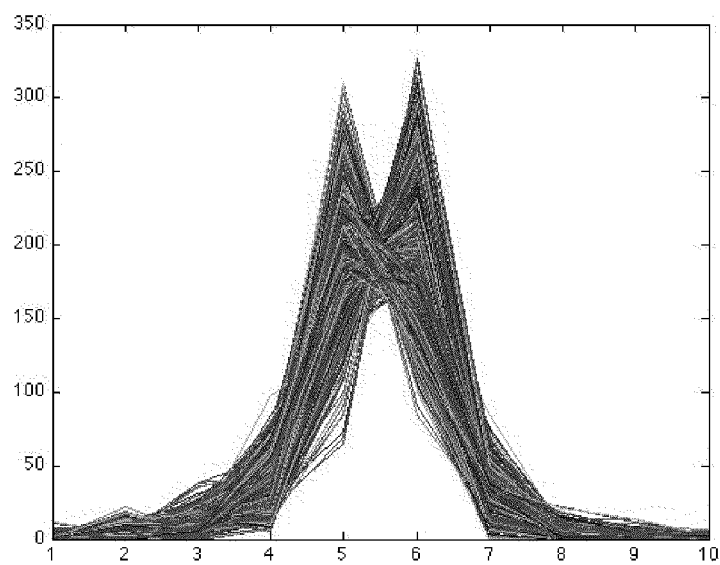
Figure 7D:
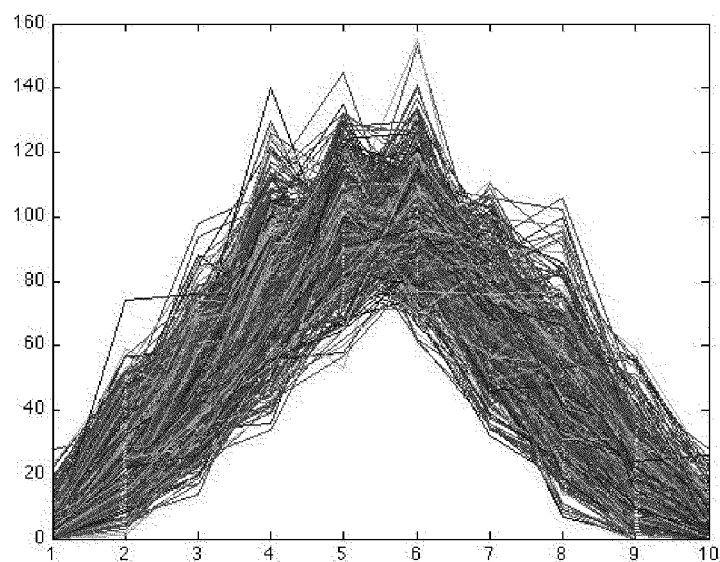
Figure 7E:
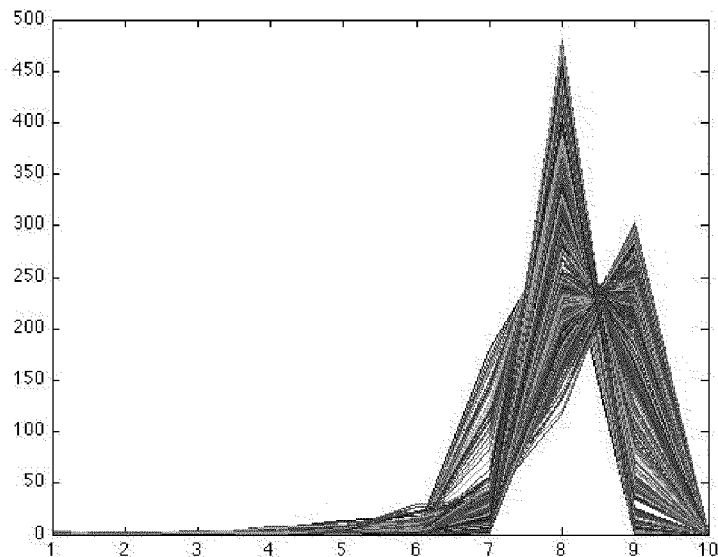
Figure 7F:
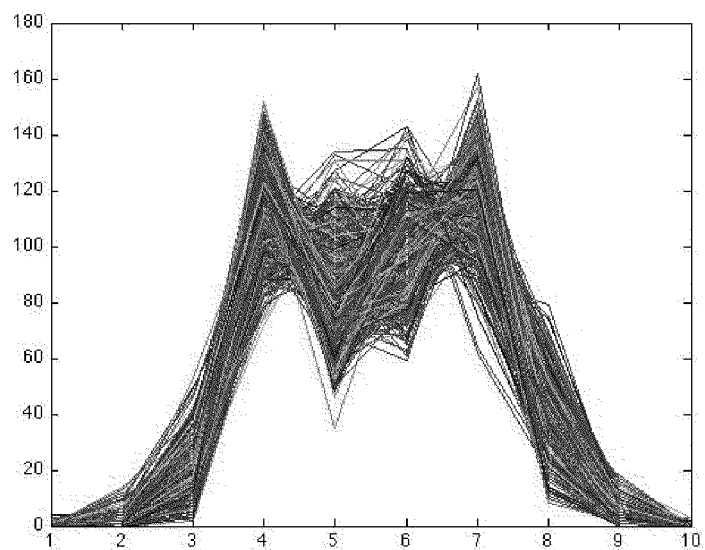

Referring to FIGS. 7A-F, examples of characteristic reference histograms that are stored in the reference histogram data 160 of the reference data 158 are presented. The reference histograms in the reference data 158 represent characteristic grayscale luminance distributions for various types of surfaces. For example, FIG. 7A shows an example of a reference histogram 700A that is characteristic of the asphalt surface type. In this illustration, each line in the reference histogram 700A represents data collected from an image of some asphalt surface. Each pixel in this image is associated with a value ranging from 1 to 10, based on the luminous intensity of the pixel. For each value i from 1 to 10 along the horizontal axis, a point $(i, y_i)$ is plotted, where $y_i$ is the number of pixels in the image having luminous intensity value i. The line representing the image is then plotted by connecting the ten points $(i, y_i)$, $i=1, \ldots, 10$. Similarly, FIG. 7B shows an example of a reference histogram 700B that is characteristic of the mulch surface type, FIG. 7C shows an example of a reference histogram 700C that is characteristic of the brick surface type, FIG. 7D shows an example of a reference histogram 700D that is characteristic of the grass surface type, FIG. 7E shows an example of a reference histogram 700E that is characteristic of the painted concrete surface type, and FIG. 7F shows an example of a reference histogram 700F that is characteristic of the unpainted concrete surface type.

Although FIGS. 7A-F illustrate examples of surface types and corresponding reference histograms, the reference histogram data 160 is not limited to these specific examples. The reference histogram data 160 may include any number of reference histograms corresponding to any number and types of surfaces.

While certain types of surfaces may have fairly distinguishable characteristic grayscale luminance distributions, other types of surface may have less distinguishable characteristic grayscale luminance distributions. Accordingly, the pixel value analysis algorithm 140 may be more or less effective for a given type of surfaces. Therefore, it may be beneficial to run other image analysis processes in combination with the pixel value analysis algorithm 140 in order to confirm, validate, verify, and/or otherwise support any output of the pixel value analysis algorithm 140. For example, referring again to FIGS. 7A-F, the histograms for asphalt (e.g., the reference histogram 700A), brick (e.g., the reference histogram 700C), painted concrete (e.g., the reference histogram 700E), and unpainted concrete (e.g., the reference histogram 700F) may be fairly distinctive. By contrast, the histograms for mulch (e.g., reference histogram 700B) and grass (e.g., reference histogram 700D) are not as distinctive and may be confused with each other. Therefore, the pixel value analysis algorithm 140 may be more effective for determining asphalt, brick, painted concrete, and unpainted concrete, but less effective for determining mulch and grass.

Applicants have further appreciated that certain types of surfaces may have distinctly characteristic colors. Accordingly, the color analysis algorithm 142 may be used to perform a color matching operation. For example, the color analysis algorithm 142 may be used to analyze the RGB color data (or color data in accordance with some suitable color model other than the RGB model) of certain frames of the image data 134 from the digital video cameras 112. The color analysis algorithm 142 may then determine the most prevalent color that is present in the image frames. Next, the color analysis algorithm 142 may correlate the most prevalent color found in the image frames to a certain type of surface. Table 1 below shows an example of the correlation of surface type to color. The contents of Table 1 may be stored, for example, in the reference color data 162 of the reference data 158.

TABLE 1

Example correlation of surface type to color.

| Surface Type | Color |
|---|---|
| Asphalt | Black |
| Mulch | Medium Brown |
| Brick | Red |
| Grass | Green |
| Unpainted concrete | Gray |
| Dirt | Light Brown |

The output of the color analysis algorithm 142 may include a confidence level of the current surface matching a certain surface type, as described with reference to FIG. 9, wherein this confidence level is based on analysis of the most prevalent color. Because the most prevalent colors of certain types of surfaces may be similar (e.g., concrete and asphalt, and mulch and brick), it may be beneficial to run other image analysis processes in combination with the color matching operation of the color analysis algorithm 142 in order to confirm, validate, verify, and/or otherwise support any output of the color analysis algorithm 142.

In an HSV (respectively, HSB or HSI) color coordinate system, colors can be specified according to their hue, saturation, and value (respectively, brightness or intensity) components. Applicants have further recognized and appreciated that certain types of surfaces may have distinctly characteristic hue and saturation. Accordingly, the color analysis algorithm 142 may also be used to analyze the hue and saturation aspects of the image data 134 from the digital video cameras 112. Color analysis algorithm 142 may then correlate the hue and saturation that is found in the image data 134 to a certain type of surface. The correlation of hue and saturation to surface type may be stored in the reference hue and saturation data 166 of reference data 158.

The output of this operation of the color analysis algorithm 142 may also include a confidence level of the current surface matching a certain surface type, as described with reference to FIG. 9, wherein this confidence level is based on analysis of hue and saturation. Because the hue and saturation characteristics of certain types of surfaces may be similar, it may be beneficial to run other image analysis processes in combination with the hue and saturation analysis of the color analysis algorithm 142 in order to confirm, validate, verify, and/or otherwise support any output of the color analysis algorithm 142.

The pixel entropy algorithm 144 may be any suitable software algorithm for measuring a degree of randomness of an image in the image data 134 from the digital video cameras 112. Randomness of an image may be a measure of, for example, the presence or absence of predictable patterns in the image. As a more specific example, the pixel entropy algorithm 144 may compute an entropy value for an image in the image data 134 based on the image's grayscale luminance distribution. Alternatively, or additionally, the pixel entropy algorithm 144 may compute the entropy value based on the image's color distribution. Further still, the pixel entropy algorithm 144 may compute the entropy value based on a joint distribution of luminance and color for the image. Thus, an image that is more varied in color and/or intensity may have a higher entropy value compared to an image that is less varied in color and/or intensity. Table 2 below shows an example of the correlation of surface type to average entropy, where the average entropy for each surface type may be computed based on entropy values of a sufficiently large number of images of that surface type. The contents of Table 2 may be stored, for example, in the reference entropy values 164 of the reference data 158.

TABLE 2

Example correlation of surface type to average entropy.

| Surface Type | Average Entropy Value |
| --- | --- |
| Asphalt | 6.107 |
| Mulch | 7.517 |
| Brick | 6.642 |
| Grass | 7.546 |
| Painted concrete | 4.675 |
| Unpainted concrete | 6.300 |

In operation, the pixel entropy algorithm 144 may determine an entropy value of a current image in the image data 134 and compares this value to the values in the reference entropy values 164 (see Table 2). The output of pixel entropy algorithm 144 may include a confidence level of the current surface matching a certain surface type, as described with reference to FIG. 9, wherein this confidence level is based on analysis of entropy values. Because average entropy values of certain types of surfaces may be similar (e.g., mulch and grass), it may be beneficial to run other image analysis processes in combination with the pixel entropy algorithm 144 in order to confirm, validate, verify, and/or otherwise support any output of the pixel entropy algorithm 144.

Edge detection is a process of identifying points in a digital image at which image brightness changes sharply (e.g., a process of detecting extreme pixel differences). The edge detection algorithm 146 is used to perform edge detection on certain frames of the image data 134 from at least one digital video camera 112. In one example, the edge detection algorithm 146 may use the Sobel operator, which is well known. The Sobel operator calculates a gradient of image intensity at each point, giving a direction of largest increase from light to dark and/or from one color to another and a rate of change in that direction. The result therefore shows how "abruptly" or "smoothly" the image changes at that point and, therefore, how likely it is that that part of the image represents an edge, as well as how that edge is likely to be oriented.

The edge detection algorithm 146 may then correlate any edges found to a certain type of surface. For example, an image of a certain type of surface (e.g., mulch) may contain more edges per unit area compared to an image of another type of surface (e.g., painted concrete). The correlation of the edge characteristics to surface type may be stored in the reference edge data 168 of reference data 158. The output of the edge detection algorithm 146 may include a confidence level of the current surface matching a certain surface type, as described with reference to FIG. 9, wherein this confidence level is based on analysis of edge characteristics. Because edge characteristics of certain types of surfaces may be similar (e.g., mulch and grass), it may be beneficial to run other image analysis processes in combination with the edge detection algorithm 146 in order to confirm, validate, verify, and/or otherwise support any output of the edge detection algorithm 146.

Additionally, one or more results of edge detection may be used by the line detection algorithm 148 for further processing to determine line characteristics of certain frames of the image data 134 from at least one digital video camera 112. Like the edge detection algorithm 146, the line detection algorithm 148 may be based on one or more edge detection processes that use, for example, the Sobel operator. The line detection algorithm 148 may group together edges output by the edge detection processes based on the edges' locations, lengths, and/or orientations. For example, in one implementation, the line detection algorithm 148 may output a detected line when the total length of a group of adjacent edges exceed a certain threshold (e.g., 10 pixels).

Applicants have appreciated and recognized that different surface types may contain different line patters. For example, on a brick surface, lines are present between bricks. As another example, on a sidewalk surface, lines are present between sections of concrete. Therefore, the combination of edge detection algorithm 146 and line detection algorithm 148 may be used for recognizing the presence of lines that are, for example, repetitive, straight, and have corners. The line detection algorithm 148 may then correlate any lines found to a certain type of surface. The correlation of line characteristics to surface type may be stored in the reference line data 170 of reference data 158. The output of the line detection algorithm 148 may include a confidence level of the current surface matching a certain surface type, as described with reference to FIG. 9, wherein this confidence level is based on analysis of line characteristics. Because line characteristics of certain types of surfaces may be similar, it may be beneficial to run other image analysis processes in combination with the line detection algorithm 148 in order to confirm, validate, verify, and/or otherwise support any output of line detection algorithm 148.

Boundary detection is a process of detecting a boundary between two or more surface types. The boundary detection algorithm 150 is used to perform boundary detection on certain frames of the image data 134 from at least one digital video camera 112. In one example, the boundary detection algorithm 150 first analyzes the four corners of a frame. When two or more corners indicate different types of surfaces, the frame of the image data 134 may be classified as a "multi-surface" frame. Once classified as a "multi-surface" frame, it may be beneficial to run the edge detection algorithm 146 and/or the line detection algorithm 148, for example, to divide the frame into two or more subsections. The boundary detection algorithm 150 may then analyze the two or more subsections using any image analysis processes of the present disclosure for determining a type of surface found in any of the two or more subsections.

The output of boundary detection algorithm 150 may include a confidence level of each frame subsection matching a certain surface type, as described with reference to FIG. 9. When two or more frame subsections indicate a high probability of different surface types, this may indicate that the original frame is likely to contain a boundary between two or more surface types. In one example, the boundary detection algorithm 150 may be executed only when a low degree of matching is returned for all surface types for the original frame by other image analysis processes of the disclosure.

The compression analysis algorithm 152 may be any suitable software algorithm for performing a compression operation on image data. As is well known, in a compression operation such as standard JPEG, a discrete cosine transform (DCT) may be applied to blocks of pixels to transform the data into a frequency domain, thereby facilitating removing fine details in the image (e.g., high frequency components) that are less perceptible to humans. Applicants have recognized and appreciated that images of different surface types may be capable of different compression ratios when the same or similar compression routine is applied. Accordingly, the compression analysis algorithm 152 may be used to perform a compression routine, such as a standard JPEG compression routine using DCT, on frames of the image data 134 from the digital video cameras 112. The output of the compression routine may include a percent compression value, which may be correlated to a certain type of surfaces. Table 3 shows an example of the correlation of surface type to characteristic compression ratio when applying a standard JPEG compression routine. The contents of Table 3 are an example of the information stored in reference compression data 174.

TABLE 3

Example correlation of surface type to compression ratio.

| Surface Type | Range of Percent (%) Compression |
|---|---|
| Asphalt | about 96.6 to 96.2 |
| Dirt | about 95.5 to 95.1 |
| Brick | about 95.1 to 94.7 |
| Grass | about 93.4 to 93.0 |
| Unpainted concrete | about 96.4 to 95.7 |
| Painted concrete | about 98.9 to 98.1 |

Referring to Table 3, the example percent compression values are obtained under the following conditions: (1) all images being about the same resolution; (2) all images being about the same color depth; (3) all images being about the same size in memory (e.g., about 1 megabyte); and (4) the "loss" variable being set to about 50%, 0% being compressed to almost no recognition and 100% being substantially lossless.

The output of the compression analysis algorithm 152 may include a confidence level of the current surface matching a certain surface type, based on correlating the achieved compression ratio to a surface type, as described with reference to FIG. 9. Because compression ratios of certain types of surfaces may be similar, it may be beneficial to run other image analysis processes in combination with the compression analysis algorithm 152 in order to confirm, validate, verify, and/or otherwise support any output of the compression analysis algorithm 152.

The surface history algorithm 154 is a software algorithm for performing a comparison of a current surface type as determined by one or more of the aforementioned algorithms (either separately or in combination) to historical surface type information. In one example, the surface history algorithm 154 may compare a candidate surface type for a current frame of the image data 134 to surface type information of previous frames of the image data 134. For example, if there is a question of a current surface type being brick vs. wood, historical information of previous frames of the image data 134 may indicate that the surface type is brick and, therefore, it is most likely that the current surface type is brick, not wood.

In some embodiments, an output (e.g., a confidence level of matching) of each algorithm of the present disclosure for determining a type of surface being marked or traversed (e.g., the pixel value analysis algorithm 140, the color analysis algorithm 142, the pixel entropy algorithm 144, the edge detection algorithm 146, the line detection algorithm 148, the boundary detection algorithm 150, the compression analysis algorithm 152, or the surface history algorithm 154) may be associated with a weight factor. The weight factor may be, for example, an integer value from 0-10 or a floating point value from 0-1. Each weight factor from each algorithm may indicate an extent to which the particular algorithm's output confidence level is to be taken into account when determining a final confidence level of matching. For example, the dynamically weighted confidence level algorithm 156 may be used to set, dynamically, a weight factor for each algorithm's output. The weight factors may be dynamic because certain algorithms may be more or less effective for determining certain types of surfaces.

For example, the pixel value analysis algorithm 140 may be highly effective for distinguishing asphalt, brick, painted concrete, and unpainted concrete, but less effective for distinguishing mulch and grass. Therefore, when the pixel value analysis algorithm 140 determines the surface type to be asphalt, brick, painted concrete, or unpainted concrete, a weight factor may be set in a high range, such as between 0.70 and 0.95 on a 0-1 scale. By contrast, when the pixel value analysis algorithm 140 determines the surface type to be mulch or grass, a weight factor may be set in a low range, such as between 0.20 and 0.40 on a 0-1 scale.

In another example, the line detection algorithm 148 may be very effective for identifying brick, but less effective for identifying dirt. Therefore, when the line detection algorithm 148 determines the surface type to be brick, a weight factor may be set in a high range, such as between 0.90 and 0.95 on a 0-1 scale. By contrast, when the line detection algorithm 148 determines the surface type to be dirt, a weight factor may be set in a low range, such as between 0.20 and 0.40 on a 0-1 scale. More details of determining a final confidence level of matching are described with reference to FIG. 9.

Referring again to FIGS. 5-6 and 7A-F, the image analysis software 114 is not limited to the motion detection algorithm 138, the pixel value analysis algorithm 140, the color analysis algorithm 142, the pixel entropy algorithm 144, the edge detection algorithm 146, the line detection algorithm 148, the boundary detection algorithm 150, the compression analysis algorithm 152, the surface history algorithm 154, and the dynamically weighted probability algorithm 156, or any combinations thereof for determining a type of surface being marked or traversed. These algorithms are described for purposes of illustration only. Any algorithms that are useful for determining a type of surface being marked or traversed may be implemented in the image analysis software 114. More details of an example of a method of using the motion detection algorithm 138, the pixel value analysis algorithm 140, the color analysis algorithm 142, the pixel entropy algorithm 144, the edge detection algorithm 146, the line detection algorithm 148, the boundary detection algorithm 150, the compression analysis algorithm 152, the surface history algorithm 154, and the dynamically weighted confidence level algorithm 156 of the image analysis software 114 for determining a type of surfacing being marked or traversed are described with reference to FIG. 9.

Figure 8:
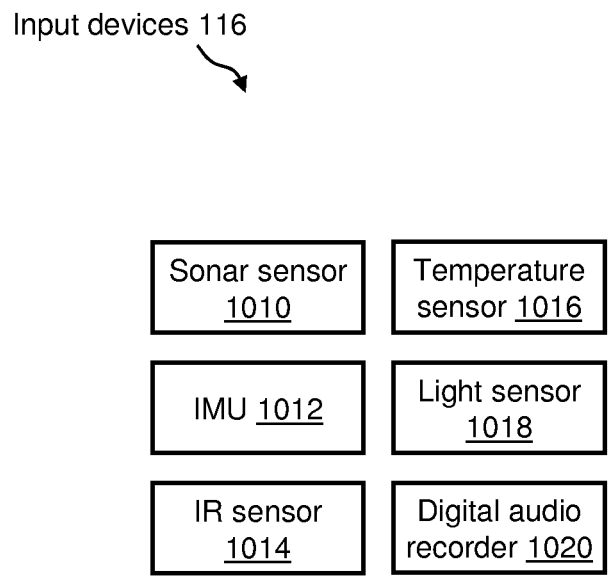
FIG. 8 illustrates a functional block diagram of examples of input devices of an imaging-enabled marking device, according to some embodiments of the present disclosure.

Referring to FIG. 8, a functional block diagram of examples of the input devices 116 of the imaging-enabled marking device 100 is presented. For example, the input devices 116 of the imaging-enabled marking device 100 of the present disclosure may include one or more of the following types of sensors: a sonar sensor 1010, an IMU 1012, an infrared (IR) sensor 1014, a temperature sensor 1016, a light sensor 1018, and a digital audio recorder 1020. However, it should be appreciated that other types of sensors may also be suitable, as aspects of the present disclosure relating to sensing are not limited to any particular types or combinations of sensors.

Unlike the digital video cameras 112, the illustrative input devices 116 are not imaging devices capable of detecting visible features of the surface being marked or traversed. However, information from the input devices 116 may be used to supplement and/or support the processes of the image analysis software 114, such as the processes described with reference to the method 1100 of FIG. 9. For example, the input devices 116 may be used to further increase a confidence level (e.g., a confidence score indicative of a likelihood of a correct hypothesis) of a type of surface determined by the algorithms of the image analysis software 114.

Referring again to FIG. 6, reference information associated with the input devices 116 may be stored in the reference data 158. For example, the reference data 158 may include reference sonar data 176, which is associated with the sonar sensor 1010; reference IR data 178, which is associated with the IR sensor 1014; and reference audio data 180, which is associated with the digital audio recorder 1020.

The sonar sensor 1010 is a device that emits an acoustic signal and detects the acoustic signal that is reflected back from one or more objects. In one example, the sonar sensor 1010 may be an ultrasonic sensor that generates high frequency sound waves and evaluates an echo that is received back by the sensor. When attached to the imaging-enabled marking device 100, the sonar sensor 1010 may emit an acoustic signal toward a surface being marked or traversed and detects the acoustic signal that is reflected back from the surface being marked or traversed. Applicants have recognized and appreciated that different types of surfaces may yield different signal strength returns and reflection characteristics because, for example, different types of surfaces may have different acoustic absorption characteristics. That is, different types of surfaces may have different sonar signatures. A set of sonar signatures for the different types of surfaces may be stored in the reference sonar data 176 of the reference data 158. In this way, the sonar sensor 1010 and the reference sonar data 176 may be used to supplement and/or support any algorithms of the image analysis software 114.

An IMU is an electronic device that measures and reports an object's acceleration, orientation, and/or gravitational forces by use of one or more inertial sensors, such as one or more accelerometers, gyroscopes, and/or compasses. The IMU 1012 may be any commercially available IMU device for reporting the acceleration, orientation, and/or gravitational forces of any device in which it is installed. In one example, the IMU 1012 may be an IMU 6 Degrees of Freedom (6DOF) device, which is available from SparkFun Electronics (Boulder, Colo.). This SparkFun IMU 6DOF device has Bluetooth® capability and provides 3 axes of acceleration data, 3 axes of gyroscopic data, and 3 axes of magnetic data. In one example, information from the IMU 1012 may be used to apply certain correction to an output of the image analysis software 114 to compensate for discrepancies due to the imaging-enabled marking device 100 being held at a certain slope or angle and/or moving in a certain way. In another example, the IMU 1012 may be used to detect any motion of the imaging-enabled marking device 100, and readings from the IMU 1012 may be used by the motion detection algorithm 138 to activate the one or more digital video cameras 112.

The IR sensor 1014 is an electronic device that measures infrared light radiating from objects in its field of view. The IR sensor 1014 may be used, for example, to measure a temperature of a surface being marked or traversed. The temperature sensor 1016 and light sensor 1018 are examples of environmental sensors that may be used in conjunction with the IR sensor 1014. In one example, the temperature sensor 1016 may detect ambient temperature ranging from about −40° C. to about +125° C., and the light sensor 1018 may be a cadmium sulfide (CdS) photocell, which is a photoresistor device whose resistance decreases when exposed to increasing incident light intensity. In this example, the data that is returned from the light sensor 1018 is a resistance measurement.

Applicants have recognized and appreciated that, because different surface types may have different energy absorption characteristics and/or specific heat capacities, certain types of surfaces may have higher or lower temperatures compared to other types of surfaces given the same or similar ambient temperature levels and ambient light levels. Accordingly, the IR sensor 1014 may be used in combination with the temperature sensor 1016 and the light sensor 1018 to determine a type of surface being marked or traversed. For instance, different surface types may have different expected temperatures depending on environmental conditions such as ambient temperature and ambient light (e.g., sunlight level). Thus, each surface type may have a characteristic expected temperature that is close to the ambient temperature but adjusted for the ambient light level. As a more specific example, grass may have an expected temperature that is about equal to the ambient temperature when shaded, but about equal to the ambient temperature plus 10° F. when in bright sunlight. By contrast, asphalt or concrete may have an expected temperature that is about equal to the ambient temperature when shaded, but about equal to the ambient temperature plus 30° F. when in bright sunlight. Accordingly, in some embodiments, if readings from the temperature sensor 1016 indicate an ambient temperature of 80° F., readings from the light sensor 1018 indicate bright sunlight, and readings from the IR sensor 1014 indicate a surface temperature of 110° F., then there is a high probability of the surface type being asphalt, not grass.

The contents of the reference IR data 178 of the reference data 158 may include a lookup table that correlates surface types to relative surface temperatures with respect to ambient temperatures and ambient light levels. In this way, the IR sensor 1014, the temperature sensor 1016, the light sensor 1018 and the reference IR data 178 may be used to supplement and/or support any algorithms of the image analysis software 114.

Additionally, the light sensor 1018 may be used to activate the light source 120 to illuminate a surface being marked or traversed when ambient light levels drop below a certain programmed threshold. Poor results from the algorithms of the image analysis software 114 may also be used to activate the light source 120 to illuminate the surface being marked or traversed, as poor results may be an indication of poor lighting conditions.

Although the IR sensor 1014 is used in the above example to measure a temperature of the surface being marked or traversed, it should be appreciated that the IR sensor 1014 may also be used in other manners. For example, the data collected by the IR sensor 1014 may be used to generate a spectral signature of the surface being marked or traversed.

More generally, one or more radiation sensors (of which the IR sensor 1014 is an example) may be employed to measure an amount of electromagnetic radiation reflected by the sensed surface at each of one or more selected wavelengths or ranges of wavelengths (e.g., visible light, infrared, ultraviolet, etc.). The source of the radiation may be natural sun light and/or an artificial light source configured to operate in conjunction with the light sensors (e.g., a calibrated light source emitting light at a specific wavelength or range of wavelengths, such as a broad spectrum IR light emitting diode). Some suitable set of information may be derived from the collected sensor data (e.g., a percentage of radiation reflected by the surface at each selected wavelength or range of wavelengths) and may be used as a spectral signature of the sensed surface. This spectral signature may be compared against a list of reference spectral signatures corresponding respectively to various surface types, to identify a potentially matching surface type. Further details regarding spectral signatures of different types of surfaces are discussed in "Remote Sensing Tutorial"[1] by Nicholas Short, which is hereby incorporated herein by reference.

[1] Available at http://rst.gsfc.nasa.gov/

Figure 8A:
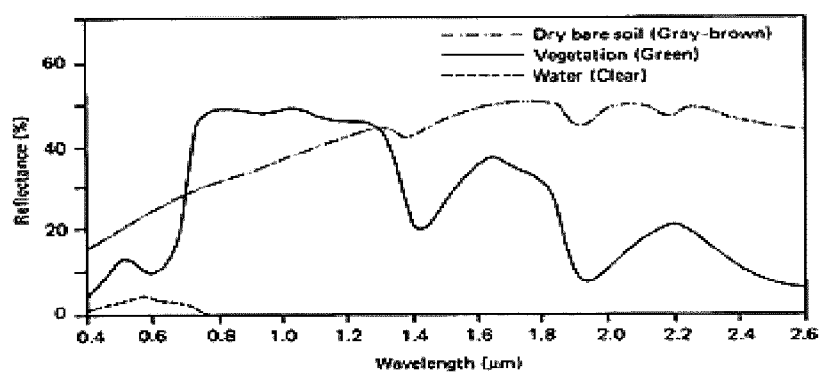
FIG. 8A reproduces illustrative spectral signatures of three different surface types.

FIG. 8A reproduces, from the Remote Sensing Tutorial, illustrative spectral signatures of three different surface types (namely, dry bare soil, vegetation, and water). As seen in this example, vegetation shows a small peak in the green region of the visible spectrum (e.g., wavelengths around 0.5 µm) and strong reflectance at wavelengths between 0.7 µm and 1.2 µm. On the other hand, soil shows a steadily increasing reflectance at wavelengths between 0.4 µm and 1.2 µm, from roughly 15% to 40%. These and other differences in spectral signatures may be used to distinguish the surface types "grass" and "soil," in accordance with some embodiments of the present disclosure. For example, a surface spectral signature derived based on sensor data collected from a surface being marked or traversed may be compared with reference spectral signatures of "grass," "soil," and/or other surface types. to identify a surface type whose spectral signature best matches the surface spectral signature.

Applicants have further recognized and appreciated that the sound of walking on grass may be different from the sound of walking on pavement. Accordingly, digital audio recorder 1020 may be useful for determining a type of surface being marked or traversed. For example, different types of surfaces may have different audio signatures. A set of reference audio signatures for the different types of surfaces may be stored in the reference audio data 180 of reference data 158. In this way, the digital audio recorder 1020 may be used to supplement and/or support any algorithms of the image analysis software 114. The digital audio recorder 1020 may be, for example, any standard digital audio recording device. The digital audio output may be stored in any standard and/or proprietary audio file format (e.g., WAV, MP3, etc.).

Referring again to FIG. 8, certain other algorithms (not shown) may be incorporated in, for example, the image analysis software 114 for processing the readings from any types of the input devices 116 that are installed in the imaging-enabled marking device 100 and determining a confidence level of matching for each type of the input devices 116 or various combinations of the input devices 116.

Figure 11:
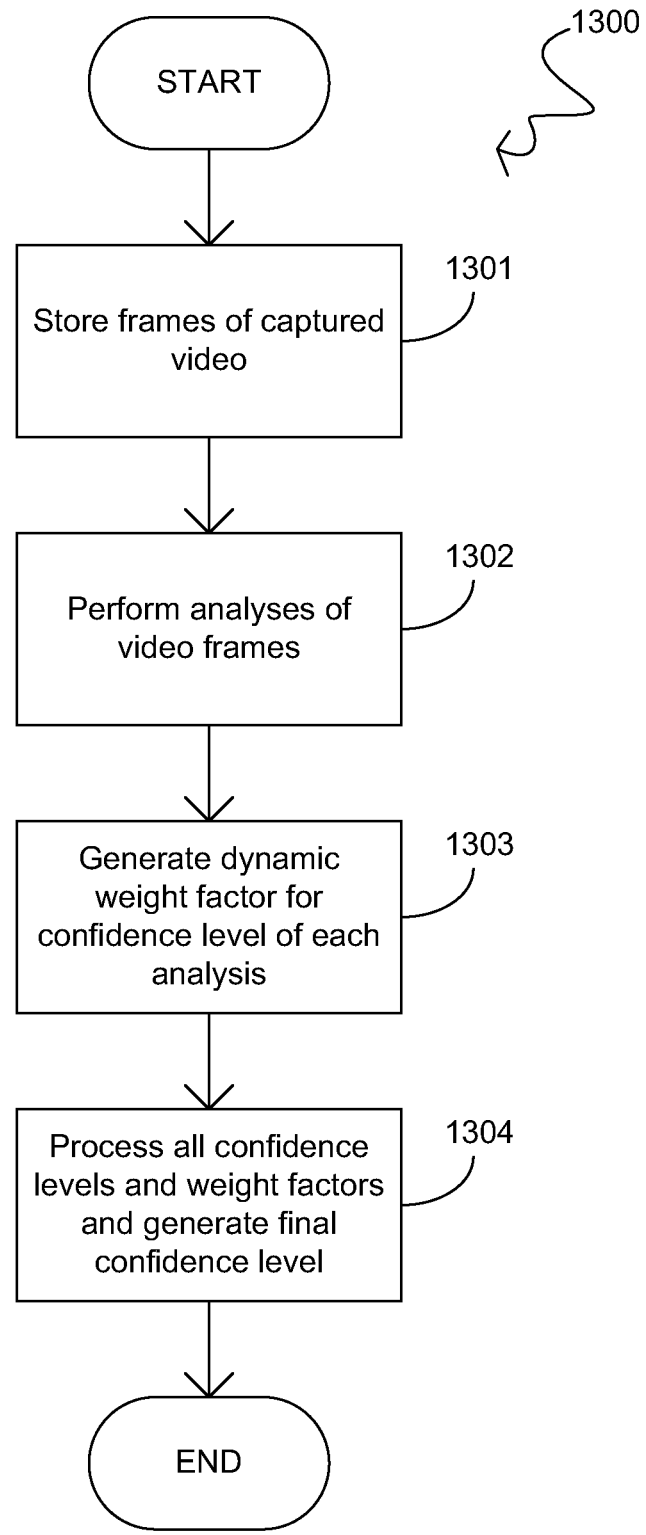
FIG. 11 illustrates a flow diagram of an example of a method for determining a type of surface being marked or traversed, according to some embodiments of the present disclosure.

Referring to FIG. 11, a flow diagram of an example of a method 1300 for determining a type of surfacing being marked or traversed by the imaging-enabled marking device 100 is presented. The method 110 may include, but is not limited to, the following steps.

At step 1301, frames of video are captured. These captured frames of video data are then analyzed at step 1302 in one or more analysis processes. Each of the analysis processes provides a putative identification result and an associated confidence level. Several exemplary analysis processes are discussed below with reference to FIG. 9. At step 1303, the results of the analyses are used to generate a dynamic weight factor for a confidence level of each of the analyses. The confidence levels and weight factors for each of the analyses are then processed at step 1304 to generate a final confidence level corresponding to an identification result. Further details relating to these steps are discussed in further detail below with respect to an exemplary embodiment with reference to FIG. 9.

Figure 9:
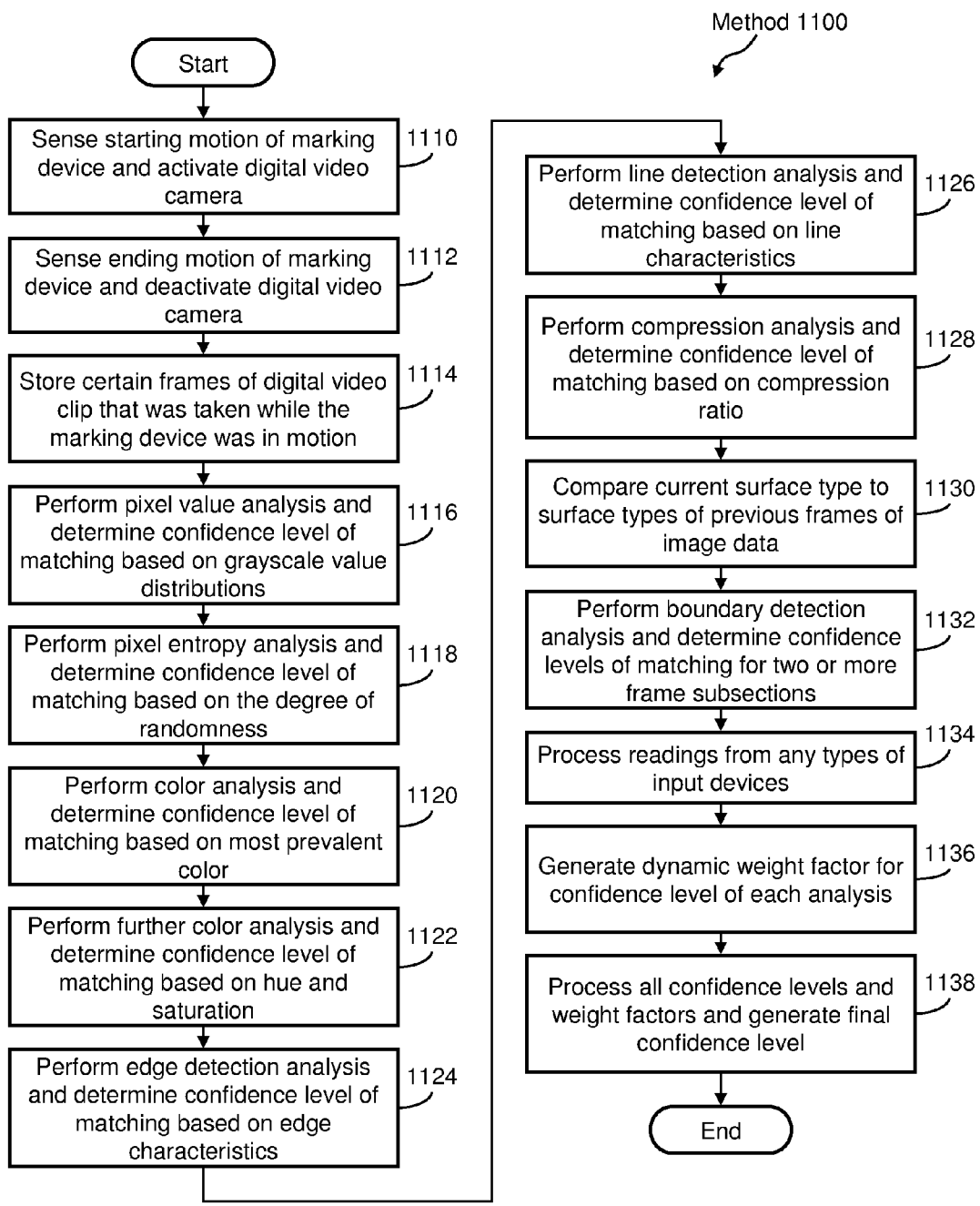
FIG. 9 illustrates a flow diagram of an example of a method of using a camera system and image analysis software for determining a type of surface being marked or traversed, according to some embodiments of the present disclosure.

Referring to FIG. 9, a flow diagram of an example of a method 1100 of using a camera system and image analysis software for determining a type of surfacing being marked or traversed by the imaging-enabled marking device 100 is presented. The method 1100 may include, but is not limited to, the following steps, which are not limited to being performed in any particular order.

At step 1110, the starting of the motion of the imaging-enabled marking device 100 may be sensed by the motion detection algorithm 138 and the digital video camera 112 may be activated. More specifically, the motion detection algorithm 138 may monitor, for example, readings from the IMU 1012 and/or the output of an optical flow algorithm to determine the beginning of any motion of the imaging-enabled marking device 100. When the starting motion is sensed, the digital video camera 112 may be activated.

At step 1112, the ending of the motion of the imaging-enabled marking device 100 may be sensed by the motion detection algorithm 138 and the digital video camera 112 may be deactivated. More specifically, the motion detection algorithm 118 may monitor, for example, readings from the IMU 1012 and/or the output of an optical flow algorithm to determine the ending of any motion of the imaging-enabled marking device 100. When the ending motion is sensed, the digital video camera 112 may be deactivated.

At step 1114, certain frames of the digital video clip that was taken while the imaging-enabled marking device 100 was in motion are stored. For example, every $n^{th}$ frame (e.g., every $5^{th}$, $10^{th}$ or $20^{th}$ frame) of the image data 134 from the digital video camera 112 may be passed to the processing unit 122 and stored in the local memory 124. Each frame of the image data 134 may be time-stamped and/or geo-stamped. For example, each frame of the image data 134 may be encoded with current date and time from the processing unit 122 and/or current geo-location data from the location tracking system 130.

At step 1116, a pixel value analysis may be performed on one or more frames of the image data 134 and a confidence level of matching may be determined based on grayscale luminance distribution. For example, the pixel value analysis algorithm 140 may process the current frames of the image data 134 and generate a grayscale luminance distribution histogram of the current surface being marked or traversed. The pixel value analysis algorithm 140 may then compare the current grayscale luminance distribution histogram to the reference histogram data 160 stored in the reference data 158. Examples of reference histograms to which the current grayscale luminance distribution histogram may be compared are shown in FIGS. 7A-F and described above. The output of the pixel value analysis algorithm 140 may include a confidence level for each surface type indicative of an extent to which the current surface matches that surface type. In one example, the confidence levels based on grayscale luminance distribution are: ASPHALT=62%, MULCH=7%, BRICK=81%, GRASS=5%, PAINTED CONCRETE=54%, UNPAINTED CONCRETE=35%, and DIRT=42%.

In this example, the type of surface having the highest confidence level of matching with respect to grayscale luminance distributions is BRICK. This information may be time-stamped, geo-stamped, and stored in the surface type data 136. The results of this step may be used to confirm, validate, verify, and/or otherwise support the analyses performed in any other steps of the method 1100.

At step 1118, a pixel entropy analysis may be performed on one or more frames of image data 134 and a confidence level of matching may be determined based on a degree of randomness. For example, the pixel entropy algorithm 144 may process the current frames of the image data 134 and generate an average entropy value of the current surface being marked or traversed. In one example, the pixel entropy algorithm 144 determines the average entropy value of the current frames of the image data 134 to be about 6.574. The pixel entropy algorithm 144 then compares the current average entropy value of 6.574 to the reference entropy values 164 stored in the reference data 158 (e.g., as shown in Table 2). The output of the pixel entropy algorithm 144 may include a confidence level for each surface type indicative of an extent to which the current surface matches that surface type. In one example, the confidence levels based on degree of randomness are: ASPHALT=73%, MULCH=24%, BRICK=89%, GRASS=31%, PAINTED CONCRETE=9%, UNPAINTED CONCRETE=49%, and DIRT=26%.

In this example, the type of surface having the highest confidence level of matching with respect to degree of randomness is BRICK. This information may be time-stamped, geo-stamped, and stored in the surface type data 136. The results of this step may be used to confirm, validate, verify, and/or otherwise support the analyses performed in any other steps of the method 1100.

At step 1120, a color analysis may be performed on one or more frames of the image data 134 and a confidence level of matching is determined based on a most prevalent color. For example, the color analysis algorithm 142 may process the current frames of image data 134 and generate a most prevalent color of the current surface being marked or traversed. In one example, the color analysis algorithm 142 determines the most prevalent color present in the current frames of the image data 134 is LIGHT BROWN. The color analysis algorithm 142 then compares the current most prevalent color of LIGHT BROWN to the reference color data 162 stored in the reference data 158 (e.g., as shown in Table 1). The output of color analysis algorithm 142 may include a confidence level for each surface type indicative of an extent to which the current surface matches that surface type. In one example, the confidence levels based on the most prevalent color detected in the current frames of images are: ASPHALT=82%, MULCH=43%, BRICK=57%, GRASS=11%, PAINTED CONCRETE=9%, UNPAINTED CONCRETE=75%, and DIRT=91%.

In this example, the type of surface having the highest confidence level of matching with respect to most prevalent color is DIRT. This information may be time-stamped, geo-stamped, and stored in the surface type data 136. The results of this step may be used to confirm, validate, verify, and/or otherwise support the analyses performed in any other steps of the method 1100.

At step 1122, further color analysis may be performed on one or more frames of image data 134 and a confidence level of matching may be determined based on hue and saturation. For example, the color analysis algorithm 142 may process the current frames of image data 134 and generate the hue and saturation of the current surface being marked or traversed. The color analysis algorithm 142 then compares the current hue and saturation to the reference hue and saturation data 166 stored in the reference data 158. The output of the color analysis algorithm 142 may include a confidence level for each surface type indicative of an extent to which the current surface matches that surface type. In one example, the confidence levels based on hue and saturation are: ASPHALT=27%, MULCH=59%, BRICK=74%, GRASS=11%, PAINTED CONCRETE=9%, UNPAINTED CONCRETE=33%, and DIRT=46%.

In this example, the type of surface having the highest confidence level with respect to hue and saturation is BRICK. This information may be time-stamped, geo-stamped, and stored in the surface type data 136. The results of this step may be used to confirm, validate, verify, and/or otherwise support the analyses performed in any other steps of the method 1100.

At step 1124, an edge detection analysis may be performed on one or more frames of the image data 134 and a confidence level of matching may be determined based on edge characteristics. For example, the edge detection algorithm 146 may process the current frames of image data 134 and generate edge characteristics of the current surface being marked or traversed. The edge detection algorithm 146 then compares the current edge characteristics to the reference edge data 168 stored in the reference data 158. The output of edge detection algorithm 146 may include a confidence level of matching value for the current surface matching each surface type. In one example, the confidence levels based on edge characteristics are: ASPHALT=73%, MULCH=12%, BRICK=35%, GRASS=11%, PAINTED CONCRETE=9%, UNPAINTED CONCRETE=67%, and DIRT=91%.

In this example, the type of surface having the highest confidence level with respect to edge characteristics is DIRT. This information may be time-stamped, geo-stamped, and stored in the surface type data 136. The results of this step may be used to confirm, validate, verify, and/or otherwise support the analyses performed in any other steps of the method 1100.

At step 1126, a line detection analysis may be performed on one or more frames of image data 134 and a confidence level of matching may be determined based on line characteristics. For example, the line detection algorithm 148 may process the current frames of image data 134 and generate line characteristics of the current surface being marked or traversed. The line detection algorithm 148 then compares the current line characteristics to the reference line data 170 stored in the reference data 158. The output of line detection algorithm 148 may include a confidence level for each surface type indicative of an extent to which the current surface matches that surface type. In one example, the confidence levels based on line characteristics are: ASPHALT=25%, MULCH=19%, BRICK=94%, GRASS=16%, PAINTED CONCRETE=9%, UNPAINTED CONCRETE=31%, and DIRT=17%.

In this example, the type of surface having the highest confidence level with respect to line characteristics is BRICK. This information may be time-stamped, geo-stamped, and stored in the surface type data 136. The results of this step may be used to confirm, validate, verify, and/or otherwise support the analyses performed in any other steps of the method 1100.

At step 1128, a compression analysis may be performed on one or more frames of image data 134 and a confidence level of matching may be determined based on the achieved compression ratio. For example, the compression analysis algorithm 152 performs standard JPEG compression operations on the current frames of image data 134 and generates a compression ratio for the current surface being marked or traversed. The compression analysis algorithm 152 then compares the current compression ratio to the reference compression data 174 stored in the reference data 158 (e.g., as shown in Table 3). The output of the compression analysis algorithm 152 may include a confidence level for each surface type indicative of an extent to which the current surface matches that surface type. In one example, the confidence levels based on achieved compression ratio are: ASPHALT=25%, MULCH=19%, BRICK=27%, GRASS=16%, PAINTED CONCRETE=23%, UNPAINTED CONCRETE=31%, and DIRT=13%.

In this example, the type of surface having the highest confidence level with respect to compression ratio is CONCRETE. This information may be time-stamped, geo-stamped, and stored in the surface type data 136. The results of this step may be used to confirm, validate, verify, and/or otherwise support the analyses performed in any other steps of the method 1100.

At step 1130, a candidate current surface type (e.g., as determined in any of the steps described above) may be compared to candidate surface types of previous frames of image data 134. For example, the surface history algorithm 154 queries the surface type data 136 for confidence levels from any of the aforementioned analyses performed in the method 1100. The surface history algorithm 154 determines what surface type is most often indicated as having a highest confidence level of matching in one or more previous frames of the image data 134. The surface history algorithm 154 may then indicate that the current frame of the image data 134 is most likely to be this same surface type. In one example, the surface history algorithm 154 determines that BRICK is the surface type most often indicated as having a highest confidence level of matching in one or more previous frames of the image data 134. Therefore, the surface history algorithm 154 indicates that the surface type of the current frame of the image data 134 is most likely to be BRICK. This information is time-stamped, geo-stamped, and stored in the surface type data 136. The results of this step may be used to confirm, validate, verify, and/or otherwise support the analyses performed in any other steps of the method 1100.

At step 1132, a boundary detection analysis may be performed on one or more frames of the image data 134 and a confidence level of matching may be determined for two or more subsections of a current frame of image data 134. In this step, the boundary detection algorithm 150 may be executed only when a low confidence level is returned for all surface types in the analyses of substantially all other steps of the method 1100. In one example, the boundary detection algorithm 150 is executed only when a confidence level of less than 50% is returned for all surface types in the analyses of substantially all other steps of the method 1100.

When the boundary detection analysis is performed, the boundary detection algorithm 150 may be used to analyze two or more subsections of a frame of the image data 134 to determine whether the frame is a "multi-surface" frame. For example, the boundary detection algorithm 150 may analyze each of the two or more subsections using any image analysis processes of the present disclosure for determining a type of surface found in any of the two or more subsections. The output of the boundary detection algorithm 150 may include a confidence level for each subsection of the current frame of the image data 134. When two or more frame subsections indicate a high probability of different surface types, the boundary detection algorithm may identify the frame as a "multi-surface" frame (e.g., a framing containing a boundary between two or more surface types).

At step 1134, the image analysis software 114 may process readings from any types of input devices 116 to confirm, validate, verify, and/or otherwise support the analyses performed in any other steps of the method 1100. For example, the image analysis software 114 may determine a confidence level for each type of input device 116 or any combinations of input devices 116. In one example, the image analysis software 114 may process readings from the sonar sensor 1010 and compare the current readings to information in the reference sonar data 176. In another example, the image analysis software 114 may process readings from the IR sensor 1014, the temperature sensor 1016, and the light sensor 1018 and compare the current combination of these readings to information in the reference IR data 178. In yet another example, the image analysis software 114 may compare the digital audio captured by the digital audio recorder 1020 to information in the reference audio data 180.

At step 1136, a dynamic weight factor may be generated for each confidence level associated with each analysis performed in the method 1100. For example, the dynamically weighted confidence level algorithm 156 generates respective dynamic weight factors for any outputs of the pixel value analysis algorithm 140, the color analysis algorithm 142, the pixel entropy algorithm 144, the edge detection algorithm 146, the line detection algorithm 148, the boundary detection algorithm 150, the compression analysis algorithm 152, and the surface history algorithm 154. Additionally, the dynamically weighted confidence level algorithm 156 may generate respective dynamic weight factors for any processing with respect to any one or more input devices 116. Examples of dynamic weight factors for the example outputs of steps 1116, 1118, 1120, 1122, 1124, 1126, and 1128 are shown in Table 4 below.

At step 1138, all confidence levels and weight factors may be processed and a final confidence level may be generated. For example, the dynamically weighted confidence level algorithm 156 processes any outputs of the pixel value analysis algorithm 140, the color analysis algorithm 142, the pixel entropy algorithm 144, the edge detection algorithm 146, the line detection algorithm 148, the boundary detection algorithm 150, the compression analysis algorithm 152, and the surface history algorithm 154, along with the weight factors generated in the step 1136 and generates a final confidence level. Table 4 below shows an example of the outputs and dynamic weight factors of steps 1116, 1118, 1120, 1122, 1124, 1126, and 1128 and a final confidence level. Table 4 indicates only the surface type with the highest confidence level for each of the aforementioned steps.

TABLE 4

Example algorithm outcomes and dynamic weight factors

| Surface Type | Surface Type | Confidence Level | Dynamic Weight Factor (0-1 scale) |
|---|---|---|---|
| Pixel value analysis of step 1116 | Brick | 81% | 0.60 |
| Entropy analysis of step 1118 | Brick | 89% | 0.91 |
| Most prevalent color analysis of step 1120 | Dirt | 91% | 0.80 |
| Hue and saturation analysis of step 1122 | Brick | 74% | 0.50 |
| Edge detection analysis of step 1124 | Dirt | 91% | 0.75 |
| Line detection analysis of step 1126 | Brick | 94% | 0.99 |
| Compression analysis of step 1128 | Concrete | 31% | 0.20 |
| Surface Type Result = | Brick | 2.59/4.75 | n/a |

In one example, referring to Table 4, the "surface type result" may be calculated by multiplying the confidence level by the dynamic weight factor for each entry. Next, the aforementioned calculations for all entries for each respective surface type are summed together. "Surface type result" may be the surface type with the highest sum. For example, referring to Table 4, there are four entries for BRICK with the following results: (81%×0.60)+(89%×0.91)+(74%×0.50)+(94%×0.99)= 48%81%+37%+93%=2.59 (out of 4.75). There are two entries for DIRT with the following results: (91%×0.80)+(91%×0.75)=73%+68%=1.41 (out of 4.75). There is one entry for CONCRETE with the following results: (31%× 0.20)=0.06 (out of 4.75). In this example, BRICK has the highest total and, thus, the "surface type result" is BRICK at 2.59 (out of 4.75).

The "surface type result" may be calculated for each frame of the image data 134 that is processed. Once the final "surface type result" is determined, it may be time-stamped and geo-stamped and stored in the surface type data 136 for each frame of the image data 134. The contents of the surface type data 136 may be included in any electronic records of locate operations.

The method 1100 provides an example of running multiple image analysis processes, wherein running each analysis may serve to confirm, validate, verify, and/or otherwise support the results of any other analyses and, thereby, increase the probability of correctly determining the type of surface. That is, while executing any one image analysis process alone may provide a certain amount of confidence (e.g., as expressed in terms of confidence levels or scores) in the surface type that is determined, running multiple image analysis processes may serve to increase the confidence (e.g., increase the confidence level or score of matching) of surface type that is determined.

Additionally, the method 1100 is not limited to executing the aforementioned number and types of image analyses for determining a type of surface being marked or traversed. Any number and types of image analysis processes may be executed in any suitable order in the method 1100. Further, the image analysis processes of the method 1100 may be executed in real time during locate operations for determining and recording the types of surfaces marked and/or traversed. Alternatively, post processing of frames of the image data 134 from one or more of the digital video cameras 112 may occur for determining and recording the types of surfaces.

Figure 10:
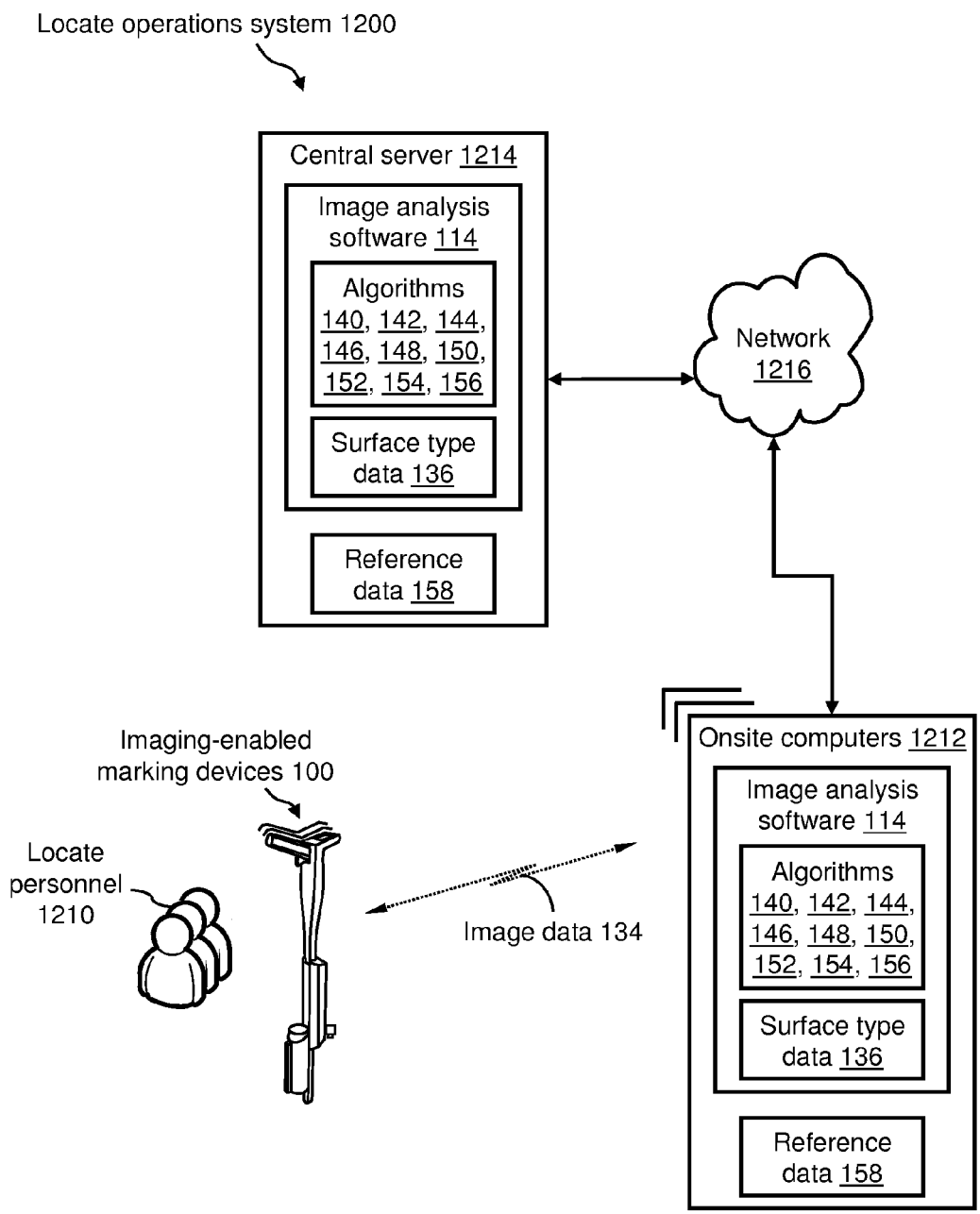
FIG. 10 illustrates a functional block diagram of an example of a locate operations system that includes one or more network of imaging-enabled marking devices, according to some embodiments of the present disclosure.

Referring to FIG. 10, a functional block diagram of an example of a locate operations system 1200 that includes a network of imaging-enabled marking devices 100 is presented. The locate operations system 1200 may include any number of imaging-enabled marking devices 100 that are operated by, for example, respective locate personnel 1210. Examples of locate personnel 1210 include locate technicians. Associated with each locate personnel 1210 and/or imaging-enabled marking device 100 may be an onsite computer 1212. Therefore, the locate operations system 1200 may also include any number of onsite computers 1212.

Each onsite computer 1212 may be any suitable computing device, such as, but not limited to, a computer that is present in a vehicle that is being used by locate personnel 1210 in the field. For example, an onsite computer 1212 may be a portable computer, a personal computer, a laptop computer, a tablet device, a personal digital assistant (PDA), a cellular radiotelephone, a mobile computing device, a touch-screen device, a touchpad device, or generally any device including, or connected to, a processor. Each imaging-enabled marking device 100 may communicate via a communication interface 126 with its respective onsite computer 1212. For instance, each imaging-enabled marking device 100 may transmit image data 134 to its respective onsite computer 1212.

While an instance of the image analysis software 114 that includes the algorithms described in FIG. 5, the surface type data 136, and the reference data 158 may reside and operate at each imaging-enabled marking device 100, an instance of the image analysis software 114, the surface type data 136, and the reference data 158 may also reside at each onsite computer 1212. In this way, the image data 134 may be processed at the onsite computer 1212 in addition to, or instead of, being processed at the imaging-enabled marking device 100. Additionally, the onsite computer 1212 may process the image data 134 concurrently with the imaging-enabled marking device 100.

Additionally, the locate operations system 1200 may include a central server 1214. The central server 1214 may be a centralized computer, such as a central server of, for example, an underground facility locate service provider. One or more networks 1216 provide a communication medium by which information may be exchanged between the imaging-enabled marking devices 100, the onsite computers 1212, and/or the central server 1214. The networks 1216 may include, for example, any local area network (LAN), wide area network (WAN), and/or the Internet. The imaging-enabled marking devices 100, the onsite computers 1212, and/or the central server 1214 may be connected to the networks 1216 using any wired and/or wireless networking technologies.

While an instance of the image analysis software 114, the surface type data 136, and the reference data 158 may reside and operate at each imaging-enabled marking device 100 and/or at each onsite computer 1212, an instance of the image analysis software 114, the surface type data 136, and the reference data 158 may also reside at the central server 1214. In this way, the image data 134 may be process at the central server 1214 in addition to, or instead of, at each imaging-enabled marking device 100 and/or at each onsite computer 1212. Additionally, the central server 1214 may process the image data 134 concurrently with the imaging-enabled marking devices 100 and/or the onsite computers 1212.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

As a more specific example, an illustrative computer that may be used for surface type detection in accordance with some embodiments comprises a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the illustrative computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for determining a surface type of a surface on which marking material is to be dispensed by a marking device to mark a presence or an absence of at least one underground facility within a dig area, wherein at least a portion of the dig area is planned to be excavated or disturbed during excavation activities, the apparatus comprising:
   at least one communication interface;
   at least one memory to store processor-executable instructions; and
   at least one processor communicatively coupled to the at least one memory and the at least one communication interface, wherein, upon execution of the processor-executable instructions, the at least one processor:
   A) obtains sensor data relating to the surface on which the marking material is to be dispensed by the marking device to mark the presence or the absence of the at least one underground facility within the dig area, the sensor data being collected by one or more sensors attached to the marking device for dispensing the marking material, wherein the one or more sensors comprise at least one camera and the sensor data of A) comprises image data representing at least one image of the surface on which the marking material is to be dispensed by the marking device to mark the presence or the absence of the at least one underground facility within the dig area captured by the camera;
   B) retrieves reference data associated with a plurality of surface types of the surface on which the marking material is to be dispensed by the marking device to mark the presence or the absence of the at least one underground facility within the dig area; and
   C) generates surface type information based at least in part on the sensor data of A) and the reference data of B),
   wherein in C), the at least one processor:
   C1) identifies, based at least in part on the sensor data of A) and the reference data of B), at least one of the plurality of surface types as a candidate surface type for the surface on which the marking material is to be dispensed by the marking device to mark the presence or the absence of the at least one underground facility within the dig area;
   C2) determines a surface signature associated with the surface on which the marking material is to be dispensed by the marking device to mark the presence or the absence of the at least one underground facility within the dig area, based at least in part on at least one of:
      i) a frequency at which edges are detected in the at least one image;
      ii) a luminance distribution associated with the image data;
      iii) color information associated with the image data;
      iv) an entropy value derived based on the image data;
      v) a presence or an absence of one or more line patterns in the at least one image; and
      vi) a compression operation on at least a portion of the image data to determine a surface compression ratio;
   C3) compares the surface signature with a plurality of reference signatures in the reference data of B) to identify the candidate surface type, wherein each reference signature is indicative of at least one of:
      i) a characteristic frequency of edges for at least one corresponding surface type in the plurality of surface types;
      ii) a characteristic luminance distribution for at least one corresponding surface type in the plurality of surface types;
      iii) a color characteristic for at least one corresponding surface type in the plurality of surface types;
      iv) a characteristic entropy value for at least one corresponding surface type in the plurality of surface types;
      v) one or more characteristic line patterns for at least one corresponding surface type in the plurality of surface types; and
      vi) a reference compression ratio associated with at least one corresponding surface type in the plurality of surface types.

2. The apparatus of claim 1, wherein the reference data of B) comprises the plurality of reference signatures, each reference signature being associated with the at least one corresponding surface type in the plurality of surface types of the surface on which the marking material is to be dispensed by the marking device to mark the presence or the absence of the at least one underground facility within the dig area, and wherein in C), the at least one processor:
   identifies at least one reference signature as being a closest match with the surface signature, wherein the at least one surface type corresponding to the at least one reference signature is identified as the candidate surface type in C1).

3. The apparatus of claim 1, wherein the reference data of B) comprises the plurality of reference signatures, each reference signature being associated with at least one corresponding surface type in the plurality of surface types, and wherein in C), the at least one processor:

associates at least one confidence score with each one of the plurality of surface types, based at least in part on an extent to which the at least one surface signature matches at least one reference signature associated with the one of the plurality of surface types on which the marking material is to be dispensed by the marking device to mark the presence or the absence of the at least one underground facility within the dig area.

4. The apparatus of claim 3, wherein in C), the at least one processor:

identifies the at least one of the plurality of surface types as being unlikely to match the surface on which the marking material is to be dispensed by the marking device to mark the presence or the absence of the at least one underground facility within the dig area, based at least in part on the at least one confidence score associated with the at least one of the plurality of surface types.

5. The apparatus of claim 3, wherein the at least one surface signature comprises first and second surface signatures, and where in C), the at least one processor:

identifies, based at least in part on the first surface signature and the reference data of B), a first surface type of the plurality of surface types as possibly matching the surface on which the marking material is to be dispensed by the marking device to mark the presence or the absence of the at least one underground facility within the dig area, the first surface type being associated with a first confidence score;

identifies, based at least in part on the second surface signature and the reference data of B), a second surface type of the plurality of surface types as possibly matching the surface on which the marking material is to be dispensed by the marking device to mark the presence or the absence of the at least one underground facility within the dig area, the second surface type being associated with a second confidence score; and identifies one of the first and the second surface types as the candidate surface type for the surface on which the marking material is to be dispensed by the marking device to mark the presence or the absence of the at least one underground facility within the dig area, based at least in part on the first and the second confidence scores.

6. The apparatus of claim 5, wherein the sensor data of A) comprises first sensor data collected by at least a first sensor and second sensor data collected by at least a second sensor, and wherein the first surface signature is determined based at least in part on the first sensor data and the second surface signature is determined based at least in part on the second sensor data.

7. The apparatus of claim 1, wherein in C1), the at least one processor:

determines the surface signature associated with the surface on which the marking material is to be dispensed by the marking device to mark the presence or the absence of the at least one underground facility within the dig area, based at least in part on the luminance distribution associated with the image data; and compares the surface signature with the plurality of reference signatures in the reference data of B) to identify the candidate surface type, wherein each reference signature is indicative of the characteristic luminance distribution for the at least one corresponding surface type in the plurality of surface types.

8. The apparatus of claim 1, wherein in C1), the at least one processor:

determines the surface signature associated with the surface on which the marking material is to be dispensed by the marking device to mark the presence or the absence of the at least one underground facility within the dig area, based at least in part on the color information associated with the image data; and compares the surface signature with the plurality of reference signatures in the reference data of B) to identify the candidate surface type, wherein each reference signature is indicative of the color characteristic for the at least one corresponding surface type in the plurality of surface types.

9. The apparatus of claim 8, wherein the color information associated with the image data comprises a spatial distribution of color in the at least one image.

10. The apparatus of claim 8, wherein the color information associated with the image data comprises a most prevalent color in the at least one image.

11. The apparatus of claim 8, wherein the color information associated with the image data comprises an average color in the at least one image.

12. The apparatus of claim 1, wherein in C1), the at least one processor:

determines the surface signature associated with the surface on which the marking material is to be dispensed by the marking device to mark the presence or the absence of the at least one underground facility within the dig area, based at least in part on the entropy value derived based on the image data; and compares the surface signature with the plurality of reference signatures in the reference data of B) to identify the candidate surface type, wherein each reference signature is indicative of the characteristic entropy value for the at least one corresponding surface type in the plurality of surface types.

13. The apparatus of claim 12, wherein the entropy value is derived based at least in part on intensity information in the image data.

14. The apparatus of claim 12, wherein the entropy value is derived based at least in part on color information in the image data.

15. The apparatus of claim 1, wherein in C1), the at least one processor:

determines the surface signature associated with the surface on which the marking material is to be dispensed by the marking device to mark the presence or the absence of the at least one underground facility within the dig area, based at least in part on the frequency at which the edges are detected in the at least one image; and compares the surface signature with the plurality of reference signatures in the reference data of B) to identify the candidate surface type, wherein each reference signature is indicative of the characteristic frequency of the edges for the at least one corresponding surface type in the plurality of surface types.

16. The apparatus of claim 1, wherein in C1), the at least one processor:

determines the surface signature associated with the surface on which the marking material is to be dispensed by the marking device to mark the presence or the absence of the at least one underground facility within the dig area, based at least in part on the presence or the absence of the one or more line patterns in the at least one image; and compares the surface signature with the plurality of reference signatures in the reference data of B) to identify the candidate surface type, wherein each reference signature is indicative of the one or more characteristic line patterns for the at least one corresponding surface type in the plurality of surface types.

17. The apparatus of claim 1, wherein the surface signature is a first surface signature, the plurality of reference signatures are a first plurality of reference signatures, and in C), the at least one processor:

determines a second surface signature associated with the surface on which the marking material is to be dispensed by the marking device to mark the presence or the absence of the at least one underground facility within the dig area, based at least in part on a second portion of the at least one image;

compares the second surface signature with a second plurality of reference signatures in the reference data of B) to identify a second surface type as possibly matching the second portion of the at least one image; and determines whether the first surface type is different from the second surface type.

18. The apparatus of claim 1, wherein in C), the at least one processor:

determines the surface compression ratio associated with the surface on which the marking material is to be dispensed by the marking device to mark the presence or the absence of the at least one underground facility within the dig area, at least in part by performing the compression operation on at least the portion of the image data; and compares the surface compression ratio with the plurality of reference compression ratios in the reference data of B) to identify the candidate surface type, wherein each reference compression ratio is associated with the at least one corresponding surface type in the plurality of surface types.

19. An apparatus for determining a surface type of a surface on which marking material is to be dispensed by a marking device to mark a presence or an absence of at least one underground facility within a dig area, wherein at least a portion of the dig area is planned to be excavated or disturbed during excavation activities, the apparatus comprising:

at least one communication interface;

at least one memory to store processor-executable instructions; and at least one processor communicatively coupled to the at least one memory and the at least one communication interface, wherein, upon execution of the processor-executable instructions, the at least one processor:

A) obtains sensor data relating to the surface on which the marking material is to be dispensed by the marking device to mark the presence or the absence of the at least one underground facility within the dig area, the sensor data being collected by one or more sensors attached to the marking device for dispensing the marking material, wherein the one or more sensors comprise an IR sensor and the sensor data of A) comprises at least one temperature measurement of the surface on which the marking material is to be dispensed by the marking device to mark the presence or the absence of the at least one underground facility within the dig area taken by the IR sensor;

B) retrieves reference data associated with a plurality of surface types of the surface on which the marking material is to be dispensed by the marking device to mark the presence or the absence of the at least one underground facility within the dig area; and C) generates surface type information based at least in part on the sensor data of A) and the reference data of B), wherein in C), the at least one processor:

C1) identifies, based at least in part on the sensor data of A) and the reference data of B), at least one of the plurality of surface types as a candidate surface type for the surface on which the marking material is to be dispensed by the marking device to mark the presence or the absence of the at least one underground facility within the dig area; and C2) compares the at least one temperature measurement with a plurality of reference temperatures in the reference data of B) to identify the candidate surface type, wherein each reference temperature is associated with at least one corresponding surface type in the plurality of surface types.

20. The apparatus of claim 19, wherein the one or more sensors further comprise an ambient temperature sensor and an ambient light sensor, and the sensor data of A) further comprises an ambient temperature level and an ambient light level measured respectively by the temperature sensor and the ambient light sensor, and wherein the plurality of reference temperatures are selected based at least in part on the ambient temperature level and the ambient light level.

21. An apparatus for determining a surface type of a surface on which marking material is to be dispensed by a marking device to mark a presence or an absence of at least one underground facility within a dig area, wherein at least a portion of the dig area is planned to be excavated or disturbed during excavation activities, the apparatus comprising:

at least one communication interface;

at least one memory to store processor-executable instructions; and at least one processor communicatively coupled to the at least one memory and the at least one communication interface, wherein, upon execution of the processor-executable instructions, the at least one processor:

A) obtains sensor data relating to the surface on which the marking material is to be dispensed by the marking device to mark the presence or the absence of the at least one underground facility within the dig area, the sensor data being collected by one or more sensors attached to the marking device for dispensing the marking material, wherein the one or more sensors comprises at least one radiation sensor capable of detecting electromagnetic radiation in at least one frequency band;

B) retrieves reference data associated with a plurality of surface types of the surface on which the marking material is to be dispensed by the marking device to mark the presence or the absence of the at least one underground facility within the dig area; and C) generates surface type information based at least in part on the sensor data of A) and the reference data of B), wherein in C), the at least one processor:

C1) identifies, based at least in part on the sensor data of A) and the reference data of B), at least one of the plurality of surface types as a candidate surface type for the surface on which the marking material is to be dispensed by the marking device to mark the presence or the absence of the at least one underground facility within the dig area;

C2) determines, based at least in part on the sensor data of A), a surface spectral signature associated with the surface on which the marking material is to be dispensed by the marking device to mark the presence or the absence of the at least one underground facility within the dig area; and C3) compares the surface spectral signature with a plurality of reference spectral signatures in the reference data of B) to identify the candidate surface type, wherein each reference spectral signature is associated with at least one corresponding surface type in the plurality of surface types.

22. In a system comprising at least one communication interface, at least one memory to store processor-executable instructions, and at least one processor communicatively coupled to the at least one memory and the at least one communication interface, a method for determining a surface type of a surface on which marking material is to be dispensed by a marking device to mark a presence or an absence of at least one underground facility within a dig area, wherein at least a portion of the dig area is planned to be excavated or disturbed during excavation activities, the method comprising acts of:

A) obtaining sensor data relating to the surface on which the marking material is to be dispensed by the marking device to mark the presence or the absence of the at least one underground facility within the dig area, the sensor data being collected by one or more sensors attached to the marking device for dispensing the marking material, wherein the one or more sensors comprise at least one camera and the sensor data of A) comprises image data representing at least one image of the surface on which the marking material is to be dispensed by the marking device to mark the presence or the absence of the at least one underground facility within the dig area captured by the camera;

B) retrieving, from the at least one memory, reference data associated with a plurality of surface types of the surface on which the marking material is to be dispensed by the marking device to mark the presence or the absence of the at least one underground facility within the dig area; and C) using the at least one processor to generate surface type information based at least in part on the sensor data of A) and the reference data of B), wherein in C), the at least one processor:

C1) identifies, based at least in part on the sensor data of A) and the reference data of B), at least one of the plurality of surface types as a candidate surface type for the surface on which the marking material is to be dispensed by the marking device to mark the presence or the absence of the at least one underground facility within the dig area;

C2) determines a surface signature associated with the surface on which the marking material is to be dispensed by the marking device to mark the presence or the absence of the at least one underground facility within the dig area, based at least in part on at least one of:
  i) a frequency at which edges are detected in the at least one image;
  ii) a luminance distribution associated with the image data;
  iii) color information associated with the image data;
  iv) an entropy value derived based on the image data;
  v) a presence or an absence of one or more line patterns in the at least one image; and
  vi) a compression operation on at least a portion of the image data to determine a surface compression ratio; and C3) compares the surface signature with a plurality of reference signatures in the reference data of B) to identify the candidate surface type, wherein each reference signature is indicative of at least one of:
  i) a characteristic frequency of edges for at least one corresponding surface type in the plurality of surface types;
  ii) a characteristic luminance distribution for at least one corresponding surface type in the plurality of surface types;
  iii) a color characteristic for at least one corresponding surface type in the plurality of surface types;
  iv) a characteristic entropy value for at least one corresponding surface type in the plurality of surface types;
  v) one or more characteristic line patterns for at least one corresponding surface type in the plurality of surface types; and
  vi) a reference compression ratio associated with at least one corresponding surface type in the plurality of surface types.

23. At least one non-transitory computer-readable storage medium encoded with at least one program including processor-executable instructions that, when executed by at least one processor, perform a method for determining a surface type of a surface on which marking material is to be dispensed by a marking device to mark a presence or an absence of at least one underground facility within a dig area, wherein at least a portion of the dig area is planned to be excavated or disturbed during excavation activities, the method comprising acts of:

A) obtaining sensor data relating to the surface on which the marking material is to be dispensed by the marking device to mark the presence or the absence of the at least one underground facility within the dig area, the sensor data being collected by one or more sensors attached to the marking device for dispensing the marking material, wherein the one or more sensors comprise at least one camera and the sensor data of A) comprises image data representing at least one image of the surface on which the marking material is to be dispensed by the marking device to mark the presence or the absence of the at least one underground facility within the dig area captured by the camera;

B) retrieving, from at least one memory, reference data associated with a plurality of surface types of the surface on which the marking material is to be dispensed by the marking device to mark the presence or the absence of the at least one underground facility within the dig area; and C) generating surface type information based at least in part on the sensor data of A) and the reference data of B), and;

C1) identifying, based at least in part on the sensor data of A) and the reference data of B), at least one of the plurality of surface types as a candidate surface type for the surface on which the marking material is to be dispensed by the marking device to mark the presence or the absence of the at least one underground facility within the dig area;

C2) determining a surface signature associated with the surface on which the marking material is to be dispensed by the marking device to mark the presence or the absence of the at least one underground facility within the dig area, based at least in part on at least one of:
  i) a frequency at which edges are detected in the at least one image;
  ii) a luminance distribution associated with the image data;
  iii) color information associated with the image data;
  iv) an entropy value derived based on the image data;
  v) a presence or an absence of one or more line patterns in the at least one image; and
  vi) a compression operation on at least a portion of the image data to determine a surface compression ratio; and
C3) comparing the surface signature with a plurality of reference signatures in the reference data of B) to identify the candidate surface type, wherein each reference signature is indicative of at least one of:
  i) a characteristic frequency of edges for at least one corresponding surface type in the plurality of surface types;
  ii) a characteristic luminance distribution for at least one corresponding surface type in the plurality of surface types;
  iii) a color characteristic for at least one corresponding surface type in the plurality of surface types;
  iv) a characteristic entropy value for at least one corresponding surface type in the plurality of surface types;
  v) one or more characteristic line patterns for at least one corresponding surface type in the plurality of surface types; and
  vi) a reference compression ratio associated with at least one corresponding surface type in the plurality of surface types.

24. A marking apparatus for performing a marking operation to mark on a surface a presence or an absence of at least one underground facility, the marking apparatus comprising:

at least one actuator to dispense a marking material so as to form at least one locate mark on the surface to mark the presence or the absence of the at least one underground facility;

at least one sensor for sensing the surface on which the marking material is to be dispensed by the marking device to mark the presence or the absence of the at least one underground facility within the dig area;

at least one user interface including at least one display device;

at least one communication interface;

at least one memory to store processor-executable instructions; and at least one processor communicatively coupled to the at least one memory, the at least one communication interface, the at least one user interface, and the at least one actuator, wherein upon execution of the processor-executable instructions, the at least one processor:
  A) obtains sensor data relating to the surface on which the marking material is to be dispensed by the marking device to mark the presence or the absence of the at least one underground facility within the dig area, the sensor data being collected by the at least one sensor;
  B) retrieves, from the at least one memory, reference data associated with a plurality of surface types of the surface on which the marking material is to be dispensed by the marking device to mark the presence or the absence of the at least one underground facility within the dig area; and
  C) generates surface type information based at least in part on the sensor data of A) and the reference data of B).

* * * * *